(12) United States Patent
Beshears et al.

(10) Patent No.: US 7,660,504 B2
(45) Date of Patent: Feb. 9, 2010

(54) CONNECTORIZED NANO-ENGINEERED OPTICAL FIBERS AND METHODS OF FORMING SAME

(75) Inventors: Robert R. Beshears, Hickory, NC (US); Dana C. Bookbinder, Corning, NY (US); Terry L. Cooke, Hickory, NC (US); John B. Johnson, Taylorsville, NC (US); Dennis M. Knecht, Hickory, NC (US); Ming-Jun Li, Horseheads, NY (US); Michael H. Rasmussen, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 62 days.

(21) Appl. No.: 12/220,266

(22) Filed: Jul. 23, 2008

(65) Prior Publication Data

US 2008/0304796 A1   Dec. 11, 2008

Related U.S. Application Data

(63) Continuation-in-part of application No. 12/077,694, filed on Mar. 20, 2008.

(60) Provisional application No. 60/927,430, filed on May 3, 2007.

(51) Int. Cl.
*G02B 6/032* (2006.01)
(52) U.S. Cl. ...................... 385/125; 977/762
(58) Field of Classification Search ................ 385/125
See application file for complete search history.

(56) References Cited

U.S. PATENT DOCUMENTS

| | | | |
|---|---|---|---|
| 6,631,234 B1 * | 10/2003 | Russell et al. | 385/125 |
| 7,327,922 B2 | 2/2008 | Skovgaard et al. | 385/125 |
| 7,376,315 B2 | 5/2008 | Kurosawa et al. | 385/123 |
| 7,539,382 B2 * | 5/2009 | Skovgaard et al. | 385/125 |

(Continued)

FOREIGN PATENT DOCUMENTS

| | | |
|---|---|---|
| EP | 1199581 A1 | 4/2002 |
| EP | 1437612 | 7/2004 |
| WO | WO03/032039 A1 | 4/2003 |

OTHER PUBLICATIONS

Ellis, et al., "Microstructural Analysis of Random Hole Optical Fibers," IEEE Photonics Technology Letters, IEEE Service Center, Piscataway, NJ, US, vol. 16, No. 2, XP011107303, Feb. 1, 2004, pp. 491-493.
Patent Cooperation Treaty, International Search Report for International Application No. PCT/US2008/005621, Aug. 18, 2008, 2 pages.

*Primary Examiner*—Jerry T Rahll

(57) ABSTRACT

Connectorized nano-engineered optical fibers and method for forming them are disclosed. The methods include heating a mid-span bare fiber portion of the nano-engineered fiber to substantially collapse the airlines therein so as to form a substantially airline-free portion. The fiber is then inserted into a ferrule channel so that the fiber end protrudes beyond the ferrule end face, but with the substantially airline-free portion positioned at the ferrule end face. The fiber is then cleaved at or near the ferrule end face in the substantially airline-free portion, and the new fiber end face polished to create a solid fiber end face that coincides with the ferrule end face. The methods result in relatively small changes to the mode field diameter (MFD) and/or to the outer cladding diameter.

45 Claims, 13 Drawing Sheets

U.S. PATENT DOCUMENTS

2003/0165313 A1    9/2003  Broeng et al. ................ 385/125
2004/0052485 A1*   3/2004  Van Eijkelenborg et al. 385/125
2004/0247271 A1*  12/2004  Skovgaard et al. .......... 385/125
2008/0209952 A1    9/2008  Tremblay .................... 65/402
2008/0250816 A1   10/2008  Kurosawa et al. ............. 65/385
2008/0253726 A1   10/2008  Kurosawa et al. ........... 385/123

* cited by examiner

CONNECTORIZED NANO-ENGINEERED OPTICAL FIBERS AND METHODS OF FORMING SAME

CROSS-REFERENCE TO RELATED APPLICATIONS

This application is a continuation-in-part of U.S. patent application Ser. No. 12/077,694, filed Mar. 20, 2008, which claims the benefit of priority under 35 U.S.C. § 119(e) of U.S. Provisional Patent Application Ser. No. 60/927,430 filed on May 3, 2007, which Patent Application is incorporated by reference herein.

This application is also related to U.S. patent application Ser. No. 11/595,365, entitled "Method of splicing an optical fiber with holes in the cladding," filed in the United States on Nov. 9, 2007, which application is incorporated by reference herein.

BACKGROUND OF THE INVENTION

1. Field of the Invention

The present invention relates generally to connectorized optical fibers, and more specifically, to methods for collapsing airlines in the cladding of nano-engineered optical fibers that seeks results in a connectorized fiber with at most only minimal changes to the mode-field diameter and/or the outer cladding diameter of the fiber prior to connectorization.

2. Technical Background of the Invention

Optical fiber connectors are used to terminate the ends of optical fibers. Optical fiber connectors enable rapid connection and disconnection of optical fibers as compared to fusion splicing. Connectors serve to align the cores of mating optical fibers so that light can pass between them with minimal loss (attenuation), and provide a mechanical coupling to hold the mating fibers together. In the early days of fiber optic systems, the use of connectors was problematic because poor connections introduced attenuation, and the connectorization process was time-consuming and required highly trained technicians. However, manufacturers have since standardized and simplified optical fiber connectors, thereby contributing to their increased use in fiber optic systems. The increased use of connectors has greatly contributed to new uses and applications for fiber optic systems, including new and creative deployments in building infrastructures.

Attendant with the increased use of fiber optic systems are issues relating to deploying optical fiber cables wherein the cables need to be bent to accommodate the geometry of a pre-existing structure or infrastructure. Improper handling and deployment of a fiber optic cable can result in macrobending losses, also known as "extrinsic losses." In ray-optics terms, severe bending of an optical fiber can cause the angles at which the light rays reflect within the fiber to exceed the critical angle of reflection. Stated in electromagnetic-wave terms, the bending causes one or more of the guided modes of the optical fiber to become leaky modes wherein light escapes or "leaks" from the guiding region of the fiber. Such bending losses can be prevented by observing the minimum bend radius of the particular optical fibers and optical fiber cables that carry the optical fibers.

Because deploying fiber optic cables typically involves bending one or more of the cables at some location, advanced optical fibers have been developed that have improved bend performance properties. Enhanced bend performance allows for fiber optic cables to be deployed in a greater number of locations that might not otherwise be accessible due to the bending limits of a conventional fiber optic cable.

One type of bend-performance optical fiber is a "nano-engineered" fiber that utilizes small holes or voids ("airlines") formed in the optical fiber. Nano-engineered fibers operate using basically the same wave-guiding principles as ordinary optical fibers wherein the light is guided in the core by the index difference between the core and cladding, with the exception that the nano-engineered region enhances the fibers light-carrying ability even when severely bent. However, while nano-engineered bend-performance fibers offer a significant increase in the minimum bend radius, there are some shortcomings when it comes to connectorizing such fibers because of the voids present at the end of a cleaved fiber. For example, contaminants can fill the fiber voids at the fiber end face and ingress into the fiber, thereby reducing the efficiency of the connection. One such contaminant is moisture. Other contaminants include micro-debris generated at the connector end face during the connector polishing processes, such as mixtures of zirconium ferrule material and silica glass removed during polishing, abrasives from polishing films, and deionized water. These contaminants may become trapped or embedded in the airlines at the connector end face. Due to the various forces and attendant heating the connector end experiences during the polishing process, it is extremely difficult to remove the contaminants once they are in place. In addition, contaminants in the fiber that are subsequently freed during operation and/or handling of the fiber and that move across the connector end face into the fiber core region may also increase signal attenuation.

While cleaning the fibers after the connector polishing step may be possible using methods such as ultrasonic cleaning, this is most often only a temporary fix because the fiber remains at risk of future contamination because the fiber end face still has open voids. While the fiber end face may be treated using UV or heat cured materials such as adhesives or epoxies to fill the fiber voids, the material used to seal the fiber may polish at a different rate than the optical fiber, causing indentations or protrusions on the connector end face. These features may potentially interfere with the physical contact of the connector end faces during mating or, in the case of indentations, may serve as areas for debris or other contaminants to collect and adversely impact connector performance.

One approach for reducing or eliminating the risk of contamination of a nano-engineered fiber in the connectorization process is to seal the end of the fiber with a sealant material. However, this will cause a change in the mode-field diameter of the fiber if there is an index mismatch between the fiber and the sealant material. Since the most efficient optical coupling is associated with matching the mode-field diameter of the fibers being coupled, a change in the mode-field diameter of one fiber relative to another can adversely affect the splicing/coupling efficiency.

Another approach for reducing or eliminating the risk of contamination of nano-engineered fibers in the connectorization process is to use heat to collapse the airlines at the end of the fiber. However, this potentially can lead to several problems. The first is that fusing the end of the fiber tends to change the shape of the fiber and may be difficult to control in a manufacturing environment. Generally, the fused end tends to become bulbous and often will not fit into a connector ferrule. The second is that fusing the end and then connectorizing the end can lead to damaging the end as the fiber end is inserted into the ferrule during the connectorization process.

SUMMARY OF THE INTENTION

In various embodiments, the present invention provides for the substantial elimination of or the substantial prevention of trapped contamination in airlines around the fiber core of a nano-engineered fiber by substantially collapsing the airlines prior to connectorization in a manner that results in at most only minimal changes to the mode-field diameter (MFD) for single-mode fibers, or the core diameter for multi-mode fibers, and/or to the outer cladding diameter of these types of fibers.

In one embodiment, the present invention includes a method of forming a connectorized nano-engineered optical fiber. The method includes providing a nano-engineered fiber and preparing the fiber at a mid-span portion by stripping the buffer or coating and optionally cleaning the resulting bare fiber to remove residue coating or buffer. The mid-span portion length should be sufficient for installation into an optical connector while allowing the bare fiber to extend completely through the length of the connector ferrule. With the fiber coating and/or buffer removed, the fiber is then subject to localized heating. In one example embodiment of providing such heating, the fiber is positioned in a fusion splicer such that an arc is applied to the portion of the mid-span region of the fiber that will eventually be positioned at the end of the connector ferrule after the installation and polishing processes are completed.

The preferred region of the fiber to be processed is a mid-span portion, which includes a portion of the fiber near the end but at least ten fiber diameters away from the end so that the airlines are substantially collapsed some distance away from the end of the fiber to avoid the above-mentioned deleterious end-effects. The electric arc is capable of substantially collapsing the airlines in the fiber to form a substantially airline-free portion. In an example embodiment, the "substantially airline-free" portion includes one or more airlines. In a particular example embodiment, the substantially airline-free portion includes an "airline transition zone" between an "airline-free" portion and the airline-containing portion of the fiber. The transition zone includes one or more airlines (e.g., partially collapsed airlines) and has a reduced air-fill percent as compared to the airline-containing portion of the fiber, which is that portion of the fiber that remains unaffected by the localized heating of the mid-span portion of the fiber. As discussed in greater detail below, in an example embodiment, the "substantially airline-free" portion of the fiber is that portion in which the air-fill percent has been reduced by at least a factor of 5 from the airline-containing portion, more preferably by at least a factor of 50, and even more preferably by at least a factor of 500.

The current used to form the electric arc is preferably in the range from about 12 mA to about 16 mA for a single fiber. While the current needs to be sufficiently great to substantially collapse the airlines, it must also be sufficiently low to avoid damaging effects on the fiber, such as melting and deformation. In particular, the method of the present invention is carried out in a manner that results in at most only minor changes to the MFD and/or to the outer cladding diameter in the substantially airline-free portion as compared to the unprocessed portions of the fiber.

Once the airlines have been substantially collapsed, the optical fiber is installed into an optical connector with some length extending beyond the end face of the connector ferrule but with the substantially airline-free portion positioned centrally at the ferrule end face. As part of the connectorization process, the optical fiber is then precision cleaved at or near the ferrule end face so that the new fiber end is within the substantially airline-free region. Following the precision cleave, the optical connector is buffed and polished using standard polishing techniques known in the art so that the substantially airline-free fiber end face coincides with the ferrule end face.

Localized heating may be generated in various ways including, but not limited to, an electric arc generated between two electrodes (similar to that used in most fusion splicers), a heated filament, a flame or a laser, among others. Connector types include, but are not limited to, so-called SC/APC, SC/UPC, FC/APC, FC/UPC, LC/APC, LC/UPC and MT based connectors. The nano-engineered fibers for which the methods of the present invention are suitable include, but are not limited to, individual nano-engineered fibers and multi-fiber ribbons for use in either single fiber or multiple fiber connectors. As discussed below, the methods of the present invention do not apply to photonic crystal fibers because the method causes significant changes to the MFD and/or the outer cladding diameter of such fibers, which prevent proper connectorization with other like fibers, including standard optical fibers such as Corning SMF28e™ optical fiber.

Additional features and advantages of the invention will be set forth in the detailed description that follows, and in part will be readily apparent to those skilled in the art from that description or recognized by practicing the invention as described herein, including the detailed description that follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE PREFERRED EMBODIMENTS

Figure 1:
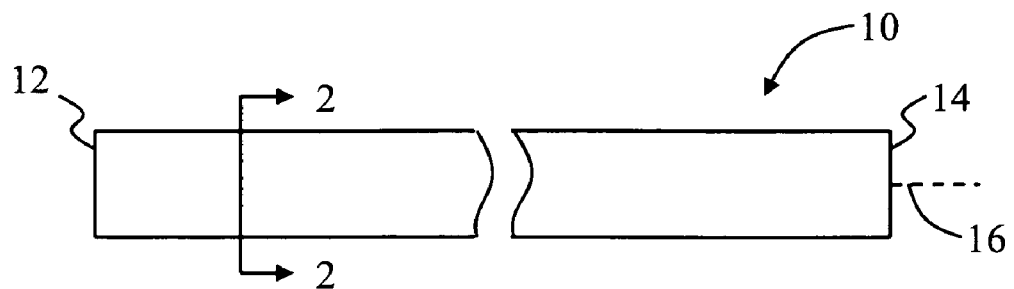
FIG. 1 is a side view of a section of nano-engineered fiber.

Reference is now made to preferred embodiments of the invention, examples of which are illustrated in the accompanying drawings. Whenever possible, the same reference numbers and symbols are used throughout the drawings to refer to the same or like parts.

Definitions and Terminology

In the description below, the "refractive index profile" is the relationship between refractive index or relative refractive index and waveguide fiber radius. The "relative refractive index percent" is defined as $\Delta_i(\%)=[(n_i^2-n_c^2)/2n_i^2]\times 100$, where $n_i$ is the maximum refractive index in region i, unless otherwise specified, and $n_c$ is the average refractive index of the cladding region, as discussed below. In an example embodiment, $n_c$ is taken as the refractive index of an inner annular cladding region 32, as discussed below.

As used herein, the relative refractive index percent is represented by Δ(%) or just "Δ" for short, and its values are given in units of "%", unless otherwise specified or as is apparent by the context of the discussion.

In cases where the refractive index of a region is less than the average refractive index of the cladding region, the relative refractive index percent is negative and is referred to as having a "depressed region" or a "depressed index," and is calculated at the point at which the relative refractive index is most negative unless otherwise specified. In cases where the refractive index of a region is greater than the average refractive index of the cladding region, the relative refractive index percent is positive and the region can be said to be raised or to have a positive index.

An "updopant" is herein considered to be a dopant, which has a propensity to raise the refractive index relative to pure undoped $SiO_2$. A "downdopant" is herein considered to be a dopant, which has a propensity to lower the refractive index relative to pure undoped $SiO_2$. An updopant may be present in a region of an optical fiber having a negative relative refractive index when accompanied by one or more other dopants that are not updopants. Likewise, one or more other dopants that are not updopants may be present in a region of an optical fiber having a positive relative refractive index. A downdopant may be present in a region of an optical fiber having a positive relative refractive index when accompanied by one or more other dopants that are not downdopants. Likewise, one or more other dopants that are not downdopants may be present in a region of an optical fiber having a negative relative refractive index.

Other techniques to form depressed index regions besides the use of downdopants, such as through the use of microstructures, are used in example embodiments of the present invention and are described in greater detail below. Microstructures include, for example, non-periodic and periodic discrete microvoids occurring along the length of the fiber such as airlines having a diameter in fiber cross-section of greater than 5 nm (nanometer) and less than 1550 nm (for example airlines greater than 5 nm with an average diameter of approximately 250 nm).

Figure 2:
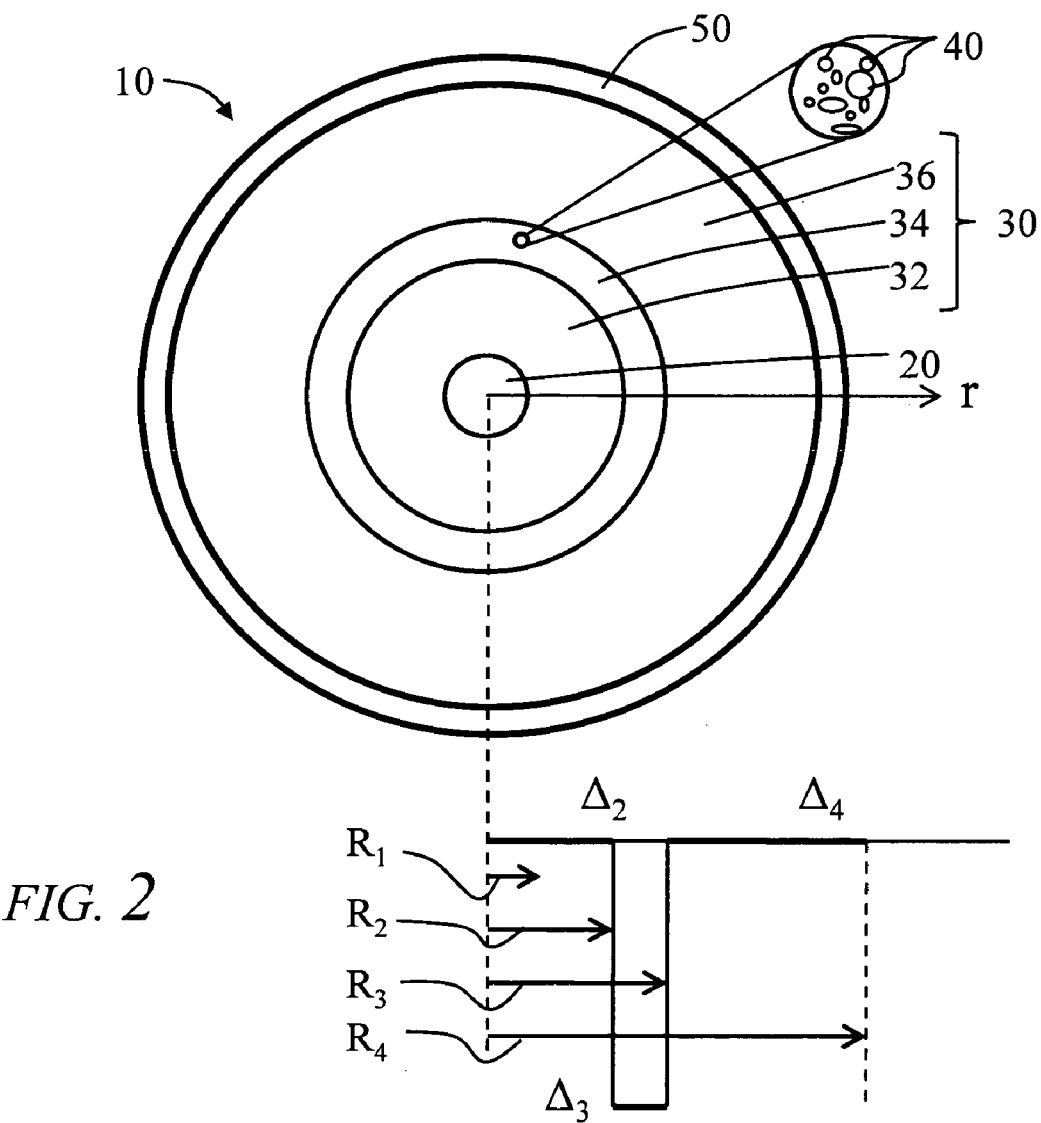
FIG. 2 is a cross-sectional view of the nano-engineered fiber of FIG. 1 as viewed along 2-2 therein, along with an example effective refractive index profile for the various fiber regions.

The "core-cladding ratio" is the "C/C ratio" which is a measure of the separation between the core region and the annular airline-containing region of a nano-engineered fiber and is given by the ratio of the (outer) radius $R_1$ of the core (the core radius $R_1$ is defined where $\Delta_1=0.04\%$ and is spaced apart from the centerline of the fiber) to the inner radius $R_2$ of the annular airline-containing region (which is the outer radius of the inner annular cladding region) as depicted schematically in FIG. 2, the "C/C" ratio as used herein is the ratio of "$R_1/R_2$." The ratio $R_1/R_2$ is evident during manufacturing of the optical fiber, and can be determined and measured after manufacturing by, for example, optical observation of the end face of the optical fiber. The higher the C/C ratio, the less cladding there is for the same amount of core, and the closer the annular airline-containing region ring is to the core, and vice versa.

The terms voids, holes and airlines can be used interchangeably and mean a portion of the optical fiber that contains empty space or a gas.

The term "airline-free" means that there are no airlines visible when the fiber end face is viewed at a magnification of 400× using an optical microscope. The smallest feature that is visible at such magnification is about 0.4 µm in diameter, so that any airlines smaller than this size may be present, but would not be considered sufficiently large to be of significance in relation to the performance of the fiber. The term "substantially airline free" means that there may be present airlines having diameter of 0.4 µm or greater, but the number of airlines (i.e., the air-fill percent) is so reduced as compared to that prior to thermally processing the fiber that they do not have a substantial impact on the performance of the fiber.

In an example embodiment, reducing the number of airlines (i.e., reducing the air-fill percent from its initial value) in a given fiber cross-section by a factor of 5 or greater is considered as forming a "substantially airline free" fiber portion. In other preferred embodiments, the initial air-fill percent is reduced by at least a factor of 50, and more preferably is reduced by at least a factor of 500 when forming the "substantially airline-free portion" of the fiber.

The mode field diameter (MFD) is a measure of the spot size or beam width of light across the end face of an optical fiber. MFD is a function of source wavelength and the fiber geometry, i.e., fiber core radius and fiber refractive index profile. The vast majority of the optical power propagating in an optical fiber travels within the fiber core, with a small amount of power propagating in the cladding as an evanescent field. Mismatches in the mode field diameter can affect splice and connector loss. The MFD is measured using the Peterman II method wherein, $2w=MFD$, and $w^2=(2\int f^2\, r dr / \int [df/dr]^2\, r dr)$, the integral limits being 0 to $\infty$. A method of experimentally measuring the MFD is the variable aperture method in the far field (VAMFF), which is described in the article by Parton, J. R., "Improvements in the Variable Aperture Method for Measuring the Mode-Field Diameter of a Dispersion-Shifted Fiber," *Journal of Lightwave Technology*, Vol. 7, No. 8, August 1989 (pp. 1158-1161), which article is incorporated by reference herein. The MFD is measured in irradiance, which is optical power per unit area ($W/cm^2$).

For a Gaussian power distribution in a single-mode optical fiber, the MFD is measured between points at which the electric and magnetic field strengths are reduced to $1/e$ of their maximum values, i.e., it is the diameter at which the optical power is reduced to $1/e^2$ of the maximum power, wherein power is proportional to the square of the field strength. As used herein, MFD assumes a given wavelength (e.g., 1550 nm) unless otherwise noted.

A related concept to MFD is the "effective area" of an optical fiber, which is defined as: $A_{eff}=2\pi(\int f^2\, r\, dr)^2/(\int f^4\, r\, dr)$, where r is the radial coordinate, the integration limits are 0 to $\infty$, and f is the transverse component of the electric field associated with light propagated in the optical fiber.

In multi-mode fibers (either the step-index or the graded-index variety), the core diameter is typically used to measure the distribution of the light beam exiting the fiber. The core size is measured optically, and in a preferred approach is defined as a diameter corresponding to a specific threshold percentage of power in the core. A standard core diameter measurement approach is set forth by the International Electrotechnical Commission (IEC) Standard IEC 60793-1-2 (2001) (see the IEC 60793-1-2 document under "Measurement methods and test procedures—Fibre geometry," Section C.4.2.2 Option 2, which document section is incorporated by reference herein by way of background information). The IEC standard is used herein as the definition of core diameter for multi-mode nano-engineered fibers 10.

Note that MFD and the core diameter are related concepts that describe the distribution of light exiting the fiber based on a threshold amount of power. In the present invention, these parameters change by substantially the same amounts. Accordingly, the description herein and the claims below use the term "mode field diameter" or MFD in the general sense to describe the light distribution associated with either a single-mode or a multi-mode fiber, where the MFD for a single-mode fiber is defined as above, and wherein the MFD of a multi-mode fiber is defined as the core diameter according to the aforementioned IEC standard.

In general, the MFD increases after heating the fibers, though in some instances the MFD could decrease. Thus, changes in the MFD (denoted "$\Delta MFD$") refer to the absolute value of the change.

Nano-Engineered Fibers

The present invention relates to nano-engineered optical fibers ("nano-engineered fibers") wherein nano-engineered features in the form of relatively small aperiodically arranged airlines facilitate the guiding of optical-frequency electromagnetic waves in a glass fiber core in a manner that makes the optical fiber resistant to optical loss even when the fiber is bent to a small bending radius (i.e., the fiber is "bend resistant"). The nano-engineered fibers otherwise operate in the same manner as standard optical fibers. This is in contrast to photonic crystal fibers, which are constituted by a periodic array of relatively large holes formed in a dielectric medium (or by an array of dielectric tubes), wherein the guiding of optical-frequency electromagnetic waves is dictated by allowed and forbidden photonic energy bands defined by the array of holes.

Nano-engineered fibers have airlines limited to a relative small airline-containing region wherein the air-fill percent (the area fraction of airlines to the area of the optical fiber times 100%, at a pre-selected cross-section) is less than about 1% and is usually about 0.02% to about 0.2% or about 0.3%. The term nano-engineered optical fiber (also sometimes referred to as micro-structured optical fiber) refers to an optical glass fiber comprising these nanometer-size features. In contrast, the holes in photonic crystal fibers occupy a large portion of the fiber and have an air-fill percent of 5% to 50%, i.e., at least five times greater, and more typically about two orders of magnitude greater than the nano-engineered fibers contemplated herein.

These important physical differences between these two types of fibers have practical implications in the connectorization process. In particular, collapsing the holes of a photonic crystal fiber necessarily causes a significant change in the fiber size and thus the MFD, which adversely impacts the connectorization process and the resulting connector. Consequently, the systems and methods described herein apply only to nano-engineered fibers and not to photonic crystal fibers.

FIG. 1 is a side view of an example embodiment of a section of nano-engineered fiber ("nano-engineered fiber") 10 having opposite ends 12 and 14, and a centerline 16. FIG. 2 is a cross-sectional view of nano-engineered fiber 10 as viewed along the direction 2-2 of FIG. 1. Nano-engineered fiber 10 includes a core region ("core") 20 made up of a single core segment having a radius $R_1$ and positive maximum relative refractive index $\Delta_1$, a cladding region ("cladding") 30 having an annular inner cladding region ("inner cladding") 32 with an inner radius $R_1$, an outer radius $R_2$ an annular width $W_{12}$ and a relative refractive index $\Delta_2$, an annular nano-engineered or "airline containing" region 34 having an inner radius $R_2$, an outer radius $R_3$ an annular width $W_{23}$ and an relative refractive index $\Delta_3$, and an outer annular cladding region ("outer cladding") 36 having an inner radius $R_3$, an outer radius $R_4$, an annular width $W_{34}$ and a relative refractive index $\Delta_4$. Outer annular cladding 36 represents the outermost silica-based portion of nano-engineered fiber 10. The total diameter of the "bare" fiber 10 is $D_{10}=2R_4$. In an example embodiment $D_{10}=125$ microns, $\Delta_1$=approximately 0.34%, $R_1$=approximately 4.5 microns, $R_2$=approximately 10.7 microns, region 34 is comprised of 100 holes having a mean diameter of approximately 300 nm and a maximum diameter of <700 nm, $W_{23}$=approximately 4 microns and $\Delta_2=\Delta_4$=approximately 0%. In another example embodiment $D_{10}=125$ microns, $\Delta_1$=approximately 0.34%, $R_1$=approximately 4.5 microns, $R_2$=approximately 13.6 microns, region 34 is comprised of 200 holes having a mean diameter of approximately 200 nm and a maximum diameter of <700 nm, $W_{23}$=approximately 3 microns and $\Delta_2=\Delta_4$=approximately 0%. In yet another example embodiment $D_{10}=125$ microns, $\Delta_1$=approximately 0.34%, $R_1$=approximately 4.5 microns, $R_2$=approximately 13.6 microns, region 34 is comprised of 400 holes having a mean diameter of approximately 150 nm and a maximum diameter of <700 nm, $W_{23}$=approximately 3 microns and $\Delta_2=\Delta_4$=approximately 0%. In yet another example embodiment $D_{10}=125$ microns, $\Delta_1$=approximately 0.34%, $R_1$=approximately 4.5 microns, $R_2$=approximately 12.2 microns, region 34 is comprised of 500 holes having a mean diameter of approximately 120 nm and a maximum diameter of <700 nm, $W_{23}$=approximately 3 microns and $\Delta_2=\Delta_4$=approximately 0%. These fibers when measured by cable cutoff show that they are single-moded above 1260 nm.

A protective cover 50 is shown surrounding outer annular cladding 36. In an example embodiment, protective cover 50 includes one or more polymer or plastic-based layers or coatings, such as a buffer coating or buffer layer.

In an example embodiment, annular airline-containing region 34 is comprised of periodically or non-periodically disposed holes or "airlines" 40 that run substantially parallel to centerline 16 and that are configured such that the optical fiber is capable of single mode transmission at one or more wavelengths in one or more operating wavelength ranges. By "non-periodically disposed" or "non-periodic distribution," it will be understood to mean that when one takes a cross-section (such as a cross-section perpendicular to the longitudinal axis) of the optical fiber, the non-periodically disposed airlines are randomly or non-periodically distributed across a portion of the fiber. Similar cross sections taken at different points along the length of the fiber will reveal different cross-sectional airline patterns, i.e., various cross-sections will have different airline patterns, wherein the distributions of airlines and sizes of airlines do not match. That is, the airlines are non-periodic, i.e., they are not periodically disposed within the fiber structure. These airlines are stretched (elongated) along the length (i.e. in a direction generally parallel to centerline 16) of the optical fiber, but do not extend the entire length of the entire fiber for typical lengths of transmission fiber. Typically the airlines extend less than 10 meters, e.g., 0.2 to 1 meter or less.

As mentioned above, the nano-engineered fibers 10 suitable for use in the present invention preferably include an air-fill percent less than about 1%, more preferably less than about 0.7%, even more preferably less than about 0.3%, and even more preferably between about 0.02% and about 0.2%. A nano-engineered fiber 10 suitable for use in the present invention further has an average hole size of about 0.3 microns or less, such as 0.15 or 0.09 microns and greater than 0.005 microns. In contrast, holey fiber available from NTT, Japan, has an average hole size of about 12 microns and an air-fill percent of >1%, and typical photonic crystal fibers have air-fill percents>5%. Thus, as mentioned above, it is the small airline size of the nano-engineered fibers considered herein that allows the fibers to retain their circularity and nominally their original size when the airlines are substantially collapsed. Note that the above-mentioned air-fill percentages are considered "initial" air-fill percentages since airlines 40 are substantially collapsed in one or more select sections of fiber 10, as described below.

Further, because of the small size of airlines 40, fibers processed using the airline collapsing methods of the present invention are ITU-T G.652 compliant in that a 125 μm fiber is +/−1 μm in diameter for proper connectorization processing after subjecting the fiber to the airline collapsing method because of the less than 1% air-fill percent. In contrast, photonic crystal fiber, after substantially collapsing the air holes therein, has a diameter change far greater than +/−1 μm, and thus is not ITU-T G.652 compliant for connectorization. Thus, the methods of the present invention are able to collapse airlines 40 while retaining about the same cross-sectional diameter and circularity, making the fibers and methods advantageous for mounting within a ferrule.

For a variety of applications, it is desirable for the airlines 40 of the nano-engineered fibers 10 considered herein to have greater than about 95% of and preferably all of the airlines exhibit a mean airline size in the cladding for the optical fiber that is less than 1550 nm, more preferably less than 775 nm, most preferably less than 390 nm and in some embodiments less than 250 nm and greater than 5 nm. Likewise, it is preferable that the maximum diameter of the airlines in the fiber be less than 7000 nm, more preferably less than 4000 nm, more preferably less than 1550 nm, and most preferably less than 775 nm and in some embodiments less than 300 nm. In some embodiments, the fibers disclosed herein have greater than 50 airlines, in some embodiments also greater than 200 airlines, and in other embodiments the total number of airlines is greater than 500 airlines, while still in other embodiments the total number of airlines is greater than 1000 airlines in a given optical fiber perpendicular cross-section. Of course, the most preferred fibers will exhibit combinations of these characteristics. Thus, for example, one particularly preferred embodiment of optical fiber would exhibit greater than about 200 airlines in the optical fiber, the airlines having a maximum diameter less than 1550 nm and a mean diameter less than 775 nm, for example, the maximum diameter is less than 775 nm and the mean diameter of about 200 nm, although useful and bend resistant optical fibers can be achieved using larger and greater numbers of airlines. The number of airlines, mean diameter, max diameter, and total void area percent of airlines can all be calculated with the help of an optical microscope at 400× or a scanning electron microscope at a magnification of about 800× and image analysis software, such as ImagePro, which is available from Media Cybernetics, Inc. of Silver Spring, Md., USA.

Because nano-engineered fibers 10 as considered herein rely on the core-cladding index difference to guide light, the fiber can generally include germania or fluorine to also adjust the refractive index of the core and/or cladding of the optical fiber, but these dopants can also be avoided in the intermediate annular region. The airlines 40 (in combination with any gas or gases that may be disposed within the airlines) can be used to adjust the manner in which light is guided down the core of the fiber, particularly when the fiber is bent. Airline-containing region 34 may consist of undoped (pure) silica, thereby completely avoiding the use of any dopants in the airline-containing region, to achieve a decreased refractive index, or the airline-containing region may comprise doped silica, e.g. fluorine-doped silica having a plurality of airlines.

In one set of embodiments, the core region 20 includes doped silica to provide a positive refractive index relative to pure silica, e.g. germania doped silica. The core region 20 is preferably free of airlines 40.

Such a nano-engineered fiber 10 can be made to exhibit a single-mode behavior with a cable cutoff of less than 1400 nm, more preferably less than 1260 nm; a 20 mm diameter macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn; a 10 mm diameter macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn.

The nano-engineered fibers 10 considered herein also include multi-mode nano-engineered fibers that comprise, for example, a graded-index core region and a cladding region surrounding and directly adjacent to the core region, the cladding region comprising a depressed-index annular portion comprising a depressed relative refractive index, relative to another portion of the cladding (which preferably is silica that is not doped with an index of refraction altering dopant such as germania or fluorine). Preferably, the refractive index profile of the core has a parabolic shape. The depressed-index annular region 34 may comprise glass comprising a plurality of airlines 40, fluorine-doped glass, or fluorine-doped glass comprising a plurality of airlines. The depressed index region 34 can be adjacent to or spaced apart from the core region.

The multi-mode nano-engineered fibers 10 considered herein also exhibit very low bend induced attenuation, in particular very low macrobending attenuation. In some embodiments, high-bandwidth is provided by a low maximum relative refractive index in the core, and low bend losses are also provided. In some embodiments, the core radius is large (e.g. greater than 10 microns, for example 25 microns and 31.25 microns), the core refractive index is approximately 2% or less (e.g. 2.0%, 1.0%, 0.90% or 0.50%), and the macrobend losses are low. Preferably, the multi-mode nano-engineered fiber 10 disclosed herein exhibits a spectral attenuation of less than 3 dB/km at 850 nm.

In an example embodiment, core 20 and cladding 30 are configured to provide improved bend resistance, and single-mode operation at wavelengths preferably greater than or equal to 1500 nm, in some embodiments also greater than about 1310 nm, in other embodiments also greater than 1260 nm. Example embodiments of the nano-engineered fibers 10 considered herein provide a MFD at a wavelength of 1310 nm preferably greater than 8.0 microns, more preferably between about 8.0 and 10.0 microns.

Example Effective Index Parameters

In one set of example embodiments, a single-mode nano-engineered fiber 10 has the following parameters: $0.30\% < \Delta_1 < 0.40\%$, and $3.0 \mu m < R_1 < 5.0 \mu m$. In some embodiments, core 20 has a refractive index profile with an alpha shape, where in some embodiments alpha is 6 or more, while in other embodiments alpha is 8 or more. An example embodiment of a multi-mode nano-engineered fiber 10 has the following parameter range: $12.5 \mu m \leq R_1 \leq 40$ microns. In some embodiments, $25 \mu m \leq R_1 \leq 32.5 \mu m$, and in some of these embodiments, $R_1$ is greater than or equal to about 25 microns and less than or equal to about 31.25 microns. In an example embodiment, core 20 preferably has a maximum relative refractive index (sometimes called $\Delta_{1MAX}$) of $0.5\% \leq \Delta_1 \leq 2.0\%$. In yet another embodiment, core 20 has a maximum relative refractive index $0.9\% \leq \Delta_1 \leq 1.1\%$. In yet another embodiment, core 20 has a maximum relative refractive index $0.4\% \leq \Delta_1 \leq 0.5\%$. Such multi-mode nano-engineered fibers 10 preferably exhibit a one-turn 10 mm diameter mandrel attenuation increase of no more than a 1 turn 10 mm diameter mandrel wrap attenuation increase at a wavelength of 1550 nm, in dB, (also called 1×10 mm dia. bend loss at 1550 nm) of less than or equal to the product of two times $(1/\Delta_{1MAX})^2$. Thus for a multi-mode nano-engineered fiber 10 having a core $\Delta_{1MAX}$ of 2% the 1×10 mm dia. bend loss at 1550 nm $\leq 2(1/2)^2 = 1$ dB; for a multi-mode fiber having a core $\Delta_{1MAX}$ of 1% the 1×10 mm dia. bend loss at 1550 nm $\leq 2(1/1)^2 = 1$ dB; and for a multi-mode nano-engineered fiber 10 having a core $\Delta_{1MAX}$ of 0.5% the 1×10 mm dia. bend loss at 1550 nm $\leq 2(1/0.5)^2 = 4$ dB.

In an example embodiment, the airline-containing region 34 has an inner radius $R_2 \leq 20 \mu m$. In some example embodiments, $10 \mu m \leq R_2 \leq 20 \mu m$. In other embodiments, $10 \mu m \leq R_2 \leq 18 \mu m$. In other embodiments, $10 \mu m \leq R_2 \leq 14 \mu m$. In some embodiments, the inner annular cladding radial width $W_{12} > 1 \mu m$. In an example embodiment, radius $R_2 > 5 \mu m$, and more preferably $R_2 > 6 \mu m$.

Again, while not being limited to any particular width, in an example embodiment, the airline-containing region 34 has a radial width $0.5 \mu m \leq W_{23}$, while in other example embodiments $0.5 \mu m \leq W_{23} \leq 20 \mu m$. In other embodiments, $2 \mu m \leq W_{23} \leq 12 \mu m$. In other embodiments, $2 \mu m \leq W_{23} \leq 10 \mu m$. In an example embodiment, the annular airline-containing region 34 has a regional void area percent of less than about 30 percent and greater than 0.5 percent, and the non-periodically disposed airlines 40 have a mean diameter of less than 1550 nm. In some embodiments, airline-containing region 34 has a regional void area percent of less than about 10% and greater than 0.5% and a mean airline diameter of less than 775 nm and greater than 5 nm. In some embodiments region 34 has a regional void area percent of less than about 6% and greater than 0.5% and a mean airline diameter of less than 300 nm and greater than 5 nm.

Figure 3:
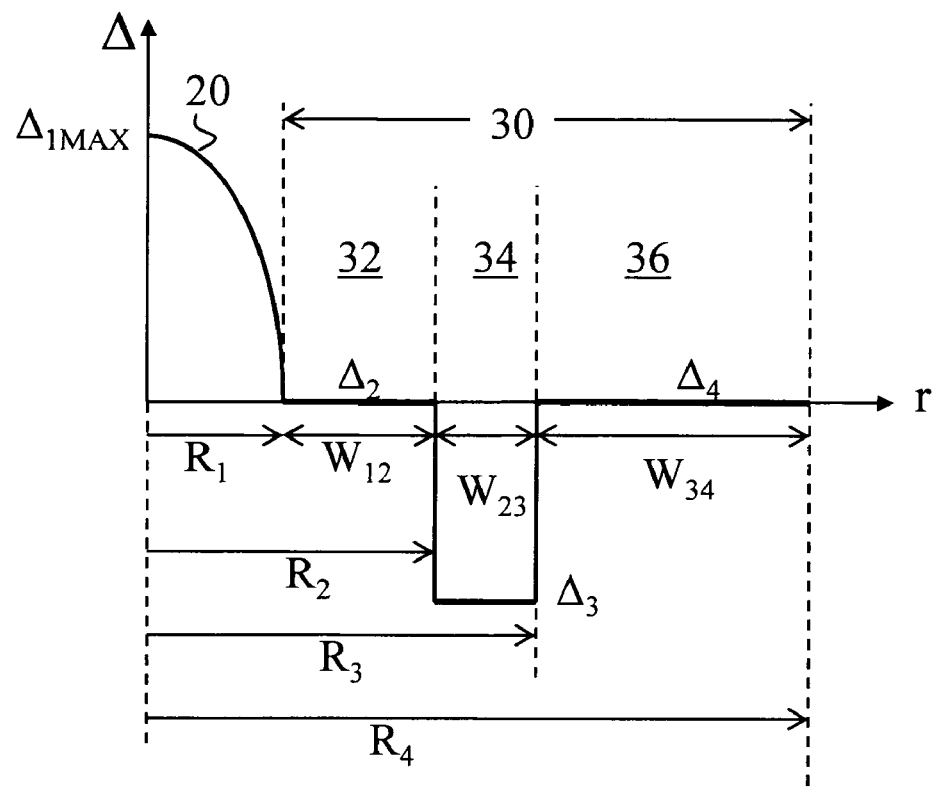
FIG. 3 is a plot of an example effective refractive index profile for an example nano-engineered fiber that has a varying-index core.

FIG. 3 is a plot of the effective refractive index $\Delta$ vs. radius r, similar to the effective refractive index plot included in FIG. 2, for an example embodiment of a refractive index profile for multi-mode version of nano-engineered fiber 10. Here, the reference refractive index $n_c$ for the effective index calculation is the average for inner annular cladding 32. The wavelength is 850 nm.

Core region 20 has a continuously varying positive effective refractive index $\Delta_1$ with a maximum $\Delta_{1MAX}$ at r=0 (i.e., at centerline 16). Outer annular cladding 36 has a substantially constant effective refractive index $\Delta_4$, and in an example embodiment $\Delta_4=\Delta_2=0\%$. In an example embodiment, airline-containing region 34 has a depressed index $\Delta_3$.

In some embodiments, the inner annular cladding 32 has a relative refractive index $\Delta_2$ having a maximum value $\Delta_{2MAX}<0.05\%$, and $-0.5\%<\Delta_{2MAX}<0.05\%$. In an example embodiment, the effective refractive index $\Delta_3$ of airline-containing region 34 is the same as $\Delta_2$ at radius $R_2$ (i.e., $\Delta_2(R_2)=\Delta_3(R_2)$).

In some embodiments, the outer annular portion 36 has a relative refractive index $\Delta_4$ having a maximum value $\Delta_{4MAX}<0.05\%$, while in other example embodiments, $-0.05\%<\Delta_{4MAX}<0.05\%$. In an example embodiment, $\Delta_4(R_3)=\Delta_3(R_3)$.

In some embodiments, the inner annular cladding region 32 comprises pure silica. In some embodiments, outer annular cladding region 36 comprises pure silica. In some embodiments, the depressed-index airline-containing region 34 comprises pure silica with a plurality of airlines 40. Preferably, the minimum relative refractive index, or average effective relative refractive index $\Delta_3$, such as taking into account the presence of any airlines, of the depressed-index annular airline-containing region 34 preferably satisfies $\Delta_3<-0.1\%$. In example embodiments, airlines 40 contain one or more gases, such as argon, nitrogen, or oxygen, or the airlines contain a vacuum with substantially no gas; regardless of the presence or absence of any gas, the effective refractive index $\Delta_3$ in the annular region 34 is lowered due to the presence of airlines 40.

As discussed above, airlines 40 can be randomly or non-periodically disposed in the annular airline-containing region 34 of cladding 30, and in other embodiments, the airlines are disposed periodically. In some embodiments, the plurality of airlines 40 comprises a plurality of non-periodically disposed airlines and a plurality of periodically disposed airlines. Alternatively, or in addition, the depressed index of annular airline-containing region 34 can also be provided by down-doping this region (such as with fluorine) or updoping one or more of the cladding regions 32 and 36 and/or the core 20, wherein the depressed-index airline-containing region 34 is, for example, pure silica or silica that is not doped as heavily as the inner annular cladding region 32.

Preferably, radius $R_1>4$ μm. In some embodiments, the minimum relative refractive index $\Delta_{3MIN}<-0.10\%$; in other embodiments, $\Delta_{3MIN}<-0.20\%$; in still other embodiments, $\Delta_{3MIN}<-0.30\%$; in yet other embodiments, $\Delta_{3MIN}<-0.40\%$.

In an example embodiment, $\Delta_{MAX}\leq 2.0\%$, more preferably $\Delta_{1MAX}\leq 1.0\%$, even more preferably $\Delta_{1MAX}<1.0\%$, and still more preferably $\Delta_{1MAX}\leq 0.8\%$; in some embodiments $0.4\%\leq\Delta_{1MAX}\leq 1.0\%$, and in other embodiments $0.5\%\leq\Delta_{1MAX}\leq 0.75\%$.

Figure 4:
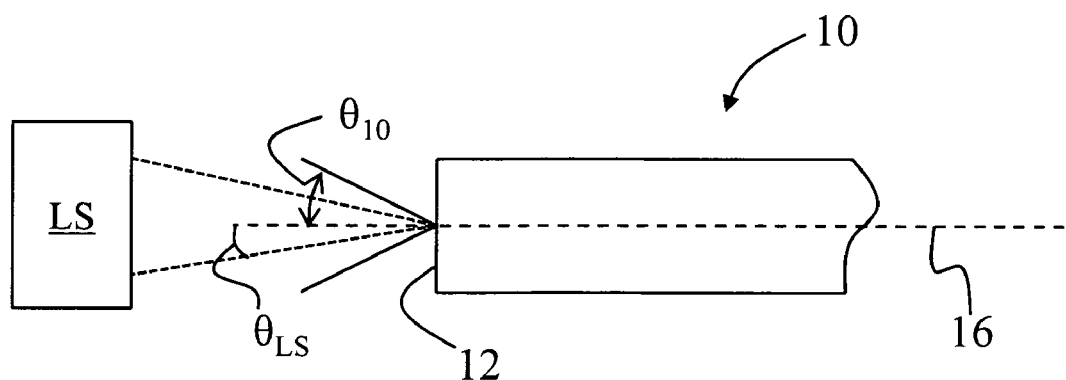
FIG. 4 is a close-up view of an end of a nanostructure fiber coupled to a light source, with the numerical aperture (NA) of the optical fiber being greater than that of the light source.

In an example embodiment, the numerical aperture (NA) of optical fiber 10 is given by $NA_{10}=n\sin\theta_{10}$ and is preferably greater than the numerical aperture $NA_{LS}=n\sin\theta_{LS}$ of an optical light source LS optically coupled to an end 12 of nano-engineered fiber 10, as shown in FIG. 4. For example, the $NA_{10}$ of the optical fiber is preferably greater than the NA of a vertical-cavity surface-emitting laser (VCSEL) source.

Multimode nano-engineered fibers 10 are discussed in U.S. patent application Ser. No. 12/004,174, entitled "Bend-resistant multimode optical fiber," filed on Dec. 20, 2007, and incorporated by reference herein. The bandwidth of the multi-mode version of nano-engineered fiber 10 varies inversely with the square of $\Delta_{1MAX}$. For example, a multi-mode nano-engineered fiber 10 with $\Delta_{1MAX}=0.5\%$ can yield a bandwidth 16 times greater than an otherwise identical multi-mode optical fiber 10 with $\Delta_{1MAX}=2.0\%$.

For example, using the designs disclosed herein, nano-engineered fibers 10 can be made that provide a bandwidth of greater than 750 MHz-km, more preferably greater than 1.0 GHz-km, and even more preferably greater than 2.0 GHz-km, and most preferably greater than 3.0 GHz-km at a wavelength of 850 nm. These high bandwidths can be achieved while still maintaining a 1 turn 10 mm diameter mandrel wrap attenuation increase at a wavelength of 1550 nm, of less than 0.5 dB, more preferably less than 0.3 dB, and most preferably less than 0.2 dB. Similarly, these high bandwidths which exhibit such impressive bend performance at 1550 nm can also maintaining a 1 turn 10 mm diameter mandrel wrap attenuation increase at a wavelength of 850 nm of less than 1.5 dB, more preferably less than 1.0 dB, and most preferably less than 0.62 dB. Such fibers can also exhibit a 1 turn 10 mm diameter mandrel wrap attenuation increase at a wavelength of 1550 nm, in dB, of less than or equal to the product of two times $(1/\Delta_{1MAX})^2$.

In some embodiments, $12.5\,\mu m\leq R_1\leq 40\,\mu m$, i.e. diameter $2R_1$ of core 20 diameter is between about 25 and 80 μm. In other embodiments, $R_1>20$ microns. In still other embodiments, $R_1>22$ microns. In yet other embodiments, $R_1>24$ microns.

Nano-Engineered Fiber Connectorization

The present invention provides methods for substantially collapsing airlines 40 in the cladding region 30 of nano-engineered fibers 10 so as to perform optical fiber connectorization in a manner that minimizes the impact on the MFD for single-mode fibers (or core diameter in the case of multi-mode fibers) and/or the outer cladding diameter and that facilitates the connectorization process by avoiding processing the fiber end directly.

Connectorization Methods

Figure 5A:
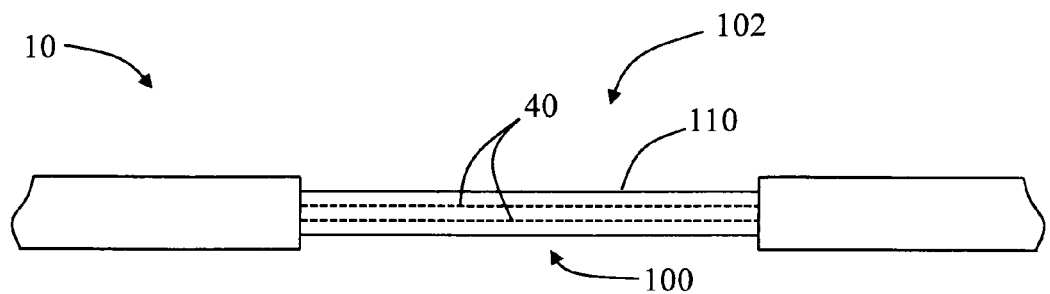
FIG. 5A is a side view of a nano-engineered fiber with a bare section formed at a mid-span location.
Figure 5B:
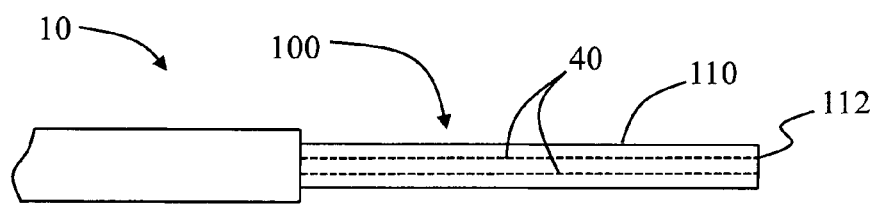
FIG. 5B is similar to FIG. 5A, and shows the nano-engineered fiber cut at one end of the mid-span location to form a fiber end face.

An example embodiment of a method for processing a nano-engineered fiber 10 for connectorization is now described. With reference now to FIG. 5A and FIG. 5B, the method includes preparing the optical fiber by stripping the buffer and/or coating layer 50 from the optical fiber over a region 100 at a mid-span location 102 to expose a length or section of bare fiber 110 as shown in FIG. 5A. Region 100 is thus referred to hereinafter as a "localized mid-span location."

Bare fiber 110 is then cut to form a fiber end face 112 (FIG. 5B). Bare fiber 110 is then optionally cleaned e.g., with isopropyl alcohol solvent. Bare fiber 110 needs to be sufficiently long to allow for fiber installation into an optical connector, allowing the bare fiber to extend completely through the length of a connector ferrule, as discussed further below. In an example embodiment, region 100 is preferably about 10 to 40 mm long. Airlines 40 are shown schematically by the parallel dashed lines in bare fiber 110.

Figure 5C:
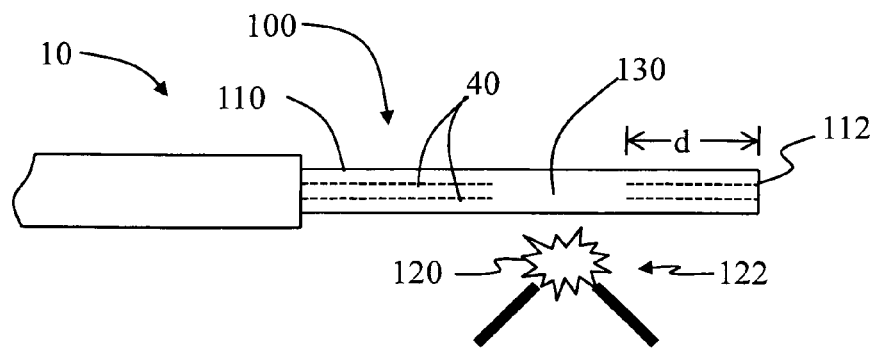
FIG. 5C is a similar to FIG. 5B, and shows the nano-engineered fiber being subject to localized heating using an electric arc that substantially collapses the airlines to form a substantially airline-free region within the fiber but at a distance d from the fiber end face.

After stripping and cleaning, then with reference to FIG. 5C, mid-span region 100 of bare optical fiber 110 is subjected to localized heat sufficient to substantially collapse airlines 40 in airline-containing region 34 (FIG. 2) to form a substantially airline-free portion 130 an axial distance d (i.e., the distance along the fiber) from fiber end face 112, wherein in an example embodiment d is at least 10 fiber diameters (i.e., $d\geq 10D_{10}$) and in another example embodiment is at least 20 fiber diameters (i.e., $d\geq 20D_{10}$). In an example embodiment, $10D_{10}\leq d\leq 80D_{10}$, while in another example embodiment $20D_{10}\leq d\leq 80D_{10}$. In an example embodiment, d is at least 5 mm (i.e., $d\geq 5$ mm) and in another example embodiment d is at least 10 mm (i.e., d≧10 mm). The concept of "substantially collapsing" airlines 40 in airline-containing region 34 is discussed in greater detail below.

Localized heating may be generated in various ways including, but not limited to, an electric arc generated between two electrodes (as is done in most fusion splicers), a heated filament, a flame or a laser, among others. In the present example embodiment, this is accomplished by using a fusion splicer 120 that produces an electric arc 122 with a prescribed current and a predetermined duration (FIG. 5C). A suitable fusion splicer for use in carrying out the method of the present invention is, for example, the Corning mini-MASS® Fusion Splicer, available from Corning Cable Systems, Inc., Hickory, N.C. The portion of bare fiber 110 is positioned in fusion splicer 120 such that the arc can be applied to the localized mid-span region 100 of the fiber, which will eventually be positioned at the end of a connector ferrule after the installation and polishing processes are completed.

The localized mid-span region 100 is subjected to an electric arc 122, which heats the fiber and causes airlines 40 therein to collapse into the cladding material. The current for electric arc 122 is for example in the range of about 12 mA to about 16 mA for a single fiber. Larger currents would be used for multiple fibers, such as fiber ribbons. A proper current setting should be great enough to collapse the airlines without damaging the fiber, such as melting and deforming.

In an example embodiment, at least some axial length of localized mid-span region 100 is heated to between approximately 2300 and 2600° K. More preferably, at least some axial length of localized mid-span region 100 is heated to between approximately 2300 and 2600° K. for greater than 500 msec. Even more preferably, at least some axial length of localized mid-span region 100 is heated to between approximately 2300 and 2600° K. for greater than 500 msec and less than 10,000 msec. Less time will result in a smaller substantially airline-free portion 130.

Figure 5D:
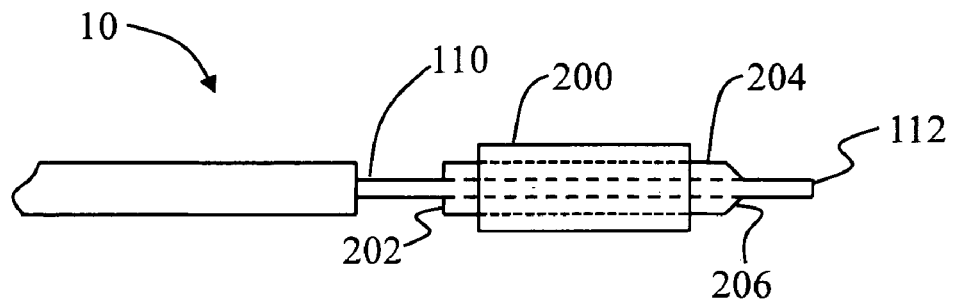
FIG. 5D is similar to FIG. 5C, and shows the step, after the substantially airline-free region is formed, where the fiber end section is inserted into a connector ferrule with a portion of the fiber end section protruding beyond the ferrule end face.

Once airlines 40 have been substantially collapsed to form a substantially airline-free portion 130 in bare fiber 110, then with reference to FIG. 5D, the bare fiber is inserted into an input end 202 of a central bore 203 (see FIG. 5E) of a connector ferrule 204 contained within an optical connector housing 200. The insertion is performed so that there is some length of bare fiber 110 that protrudes beyond ferrule output end face 206.

Figure 5E:
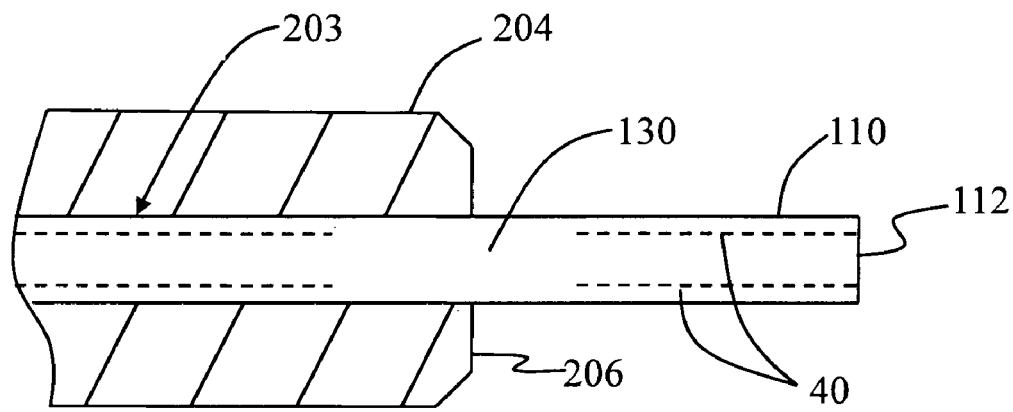
FIG. 5E is a close-up view of the ferrule end showing the ferrule end face and the fiber end section protruding from the ferrule channel beyond the ferrule end face wherein the substantially airline-free region is positioned at the fiber end face plane.

FIG. 5E is a close-up view of ferrule end face 206 of FIG. 5D. Note that substantially airline-free portion 130 of bare fiber 110 is positioned at ferrule end face 206. In an example embodiment, bare nano-engineered fiber 110 can first be inserted into a ferrule and then the airlines substantially collapsed via localized heating as described above. One skilled in the art will recognize that the order of the acts making up the method can be changed in a manner consistent with obtaining the final connectorized optical fiber assembly 250, and that performing the method in the order presented constitutes just one example embodiment of the method.

As part of the connectorization process, bare fiber 110 is then precision cleaved as close as possible to ferrule output end face 206 and within substantially airline-free portion 130 so that the new fiber end face 112 formed by the precision cleaving has substantially no airlines 40. That is to say, the new fiber end face 112 can have no airlines 40, or alternatively one or more airlines, so long as the air-fill percent of the airlines at the end face is reduced by at least a factor of 5 from the initial air-fill percent. The precision cleave is performed using, for example, a standard mechanical cleaver, or a laser-based cleaver.

Following this precision cleave step, the ferrule output end face 206 and the new fiber end face 112 is buffed and polished using standard polishing techniques known in the art so that the new fiber end face 112 is co-planar with ferrule end face 206. Inserting the stub fiber 110 having substantially collapsed airlines into a connector prior to cleaving is advantageous in that fiber end face 112 is protected from external forces and contamination until after it has been mounted within ferrule 204.

Figure 5F:
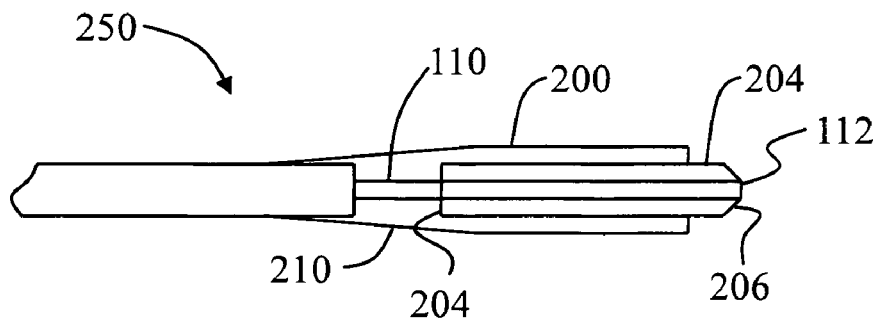
FIG. 5F is similar to FIG. 5D and shows the fiber after it is cleaved near the ferrule end face and thus at the substantially airline-free region, and is polished so that the polished fiber end coincides with the ferrule end face.

The remaining connector parts (e.g., boot 210) are then added to or otherwise incorporated with connector housing 200 to form the connectorized optical fiber assembly 250 as illustrated in the cross-sectional view of FIG. 5F.

Figure 6:
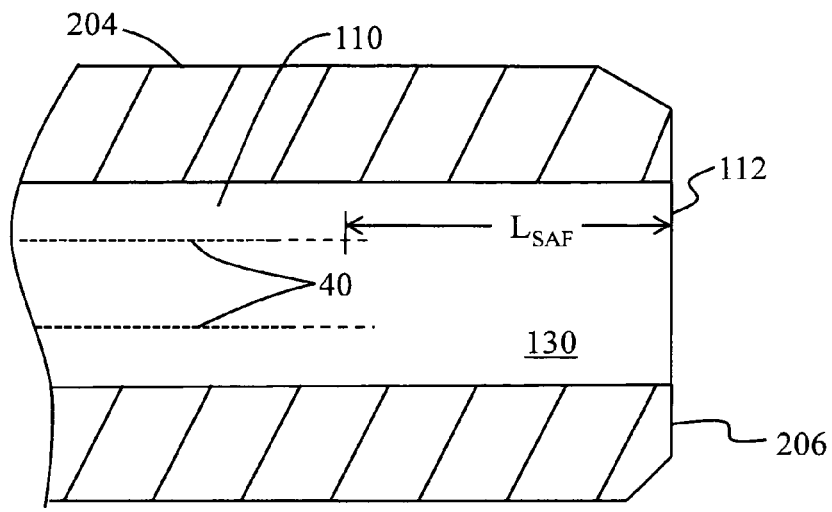
FIG. 6 is a close-up cross-sectional view similar to FIG. 5E, illustrating how the airlines terminate to form the substantially solid fiber end face.

FIG. 6 is a close-up cross-sectional view of ferrule end face 206 similar to FIG. 5E, illustrating how airlines 40 terminate to form substantially airline-free portion 130 at fiber end face 112. Length $L_{SAF}$ is the length of substantially airline-free portion 130 as measured from the new (i.e., cleaved) end face 112 formed when bare fiber 110 is arranged in ferrule 204. In an example embodiment, 10 μm≦$L_{SAF}$≦10,000 μm.

Figure 5G:
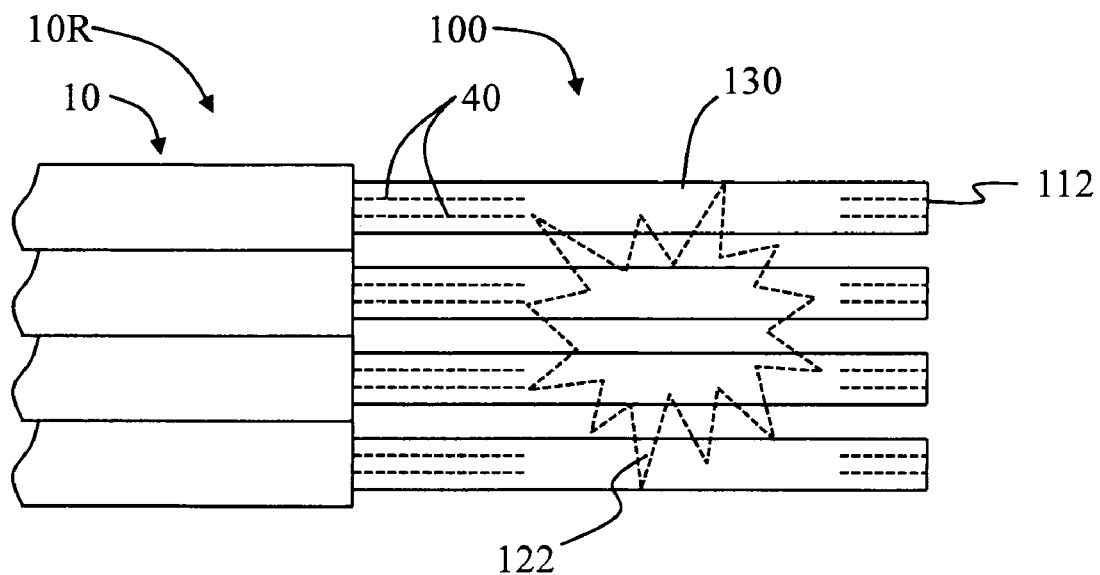
FIG. 5G and FIG. 5H are similar to FIG. 5B and FIG. 5C and illustrate an example embodiment of the invention as applied to a fiber ribbon.
Figure 5H:
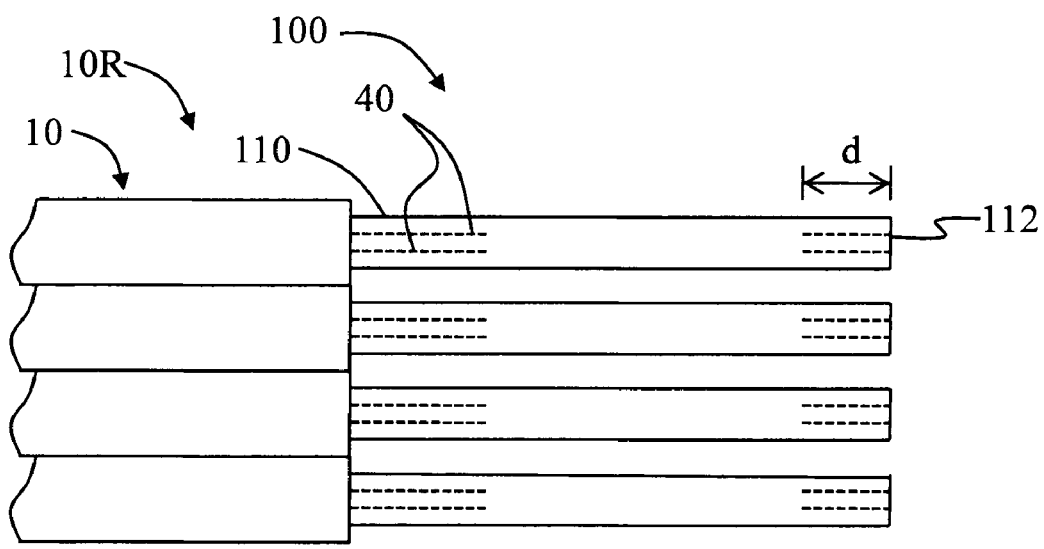

FIG. 5G and FIG. 5H are similar to FIG. 5B and FIG. 5C and illustrate an example embodiment of the present invention where airlines 40 are substantially collapsed in each of a plurality of bare nano-engineered fibers 110 in a fiber ribbon 10R. In an example embodiment, this is accomplished using a single electric arc 122 that provides a proportionally greater amount of heat than for a single bare fiber 110. The connectorization process to form connectorized optical fiber assembly 250 for the fiber ribbon is as described above, with connector ferrule 204 having a plurality of bores 203.

Figure 7A:
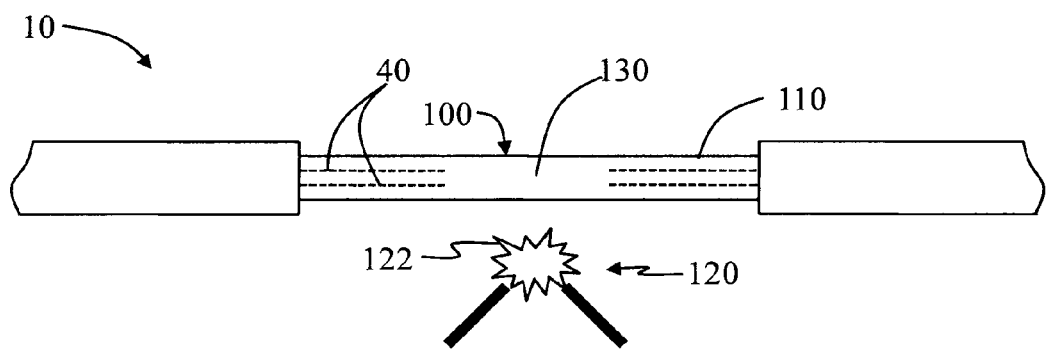
FIG. 7A is a side view similar to FIG. 5A illustrating an example embodiment of the method wherein airlines are substantially collapsed at the mid-span location via heating from an electric arc prior to cleaving bare fiber.
Figure 7B:
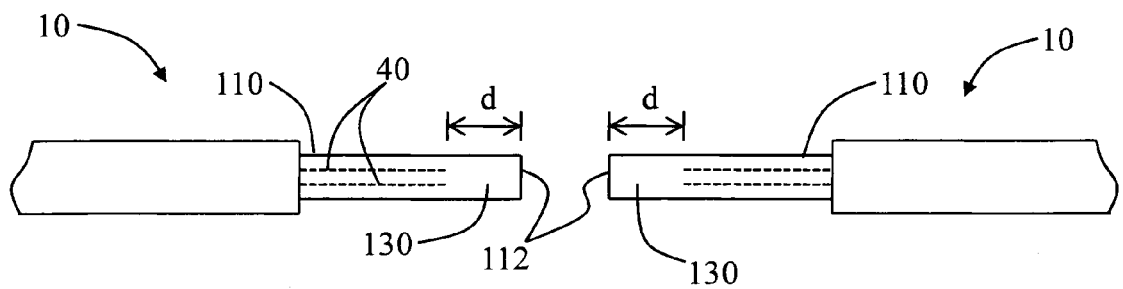
FIG. 7B is similar to FIG. 7A, but shows the two resulting fiber sections formed by cleaving the bare fiber at the mid-span substantially airline-free portion formed as shown in FIG. 7A.

FIG. 7A and FIG. 7B illustrate an example embodiment of the method wherein airlines 40 are substantially collapsed at localized mid-span region 100 prior to cleaving bare fiber 110. This approach is advantageous in that two bare stub fibers 110 are created, each having an end face 112 with respective substantially airline-free portions 130 at a distance d from their respective end faces. Each of these stub fibers can be connectorized as described above.

Figure 7C:
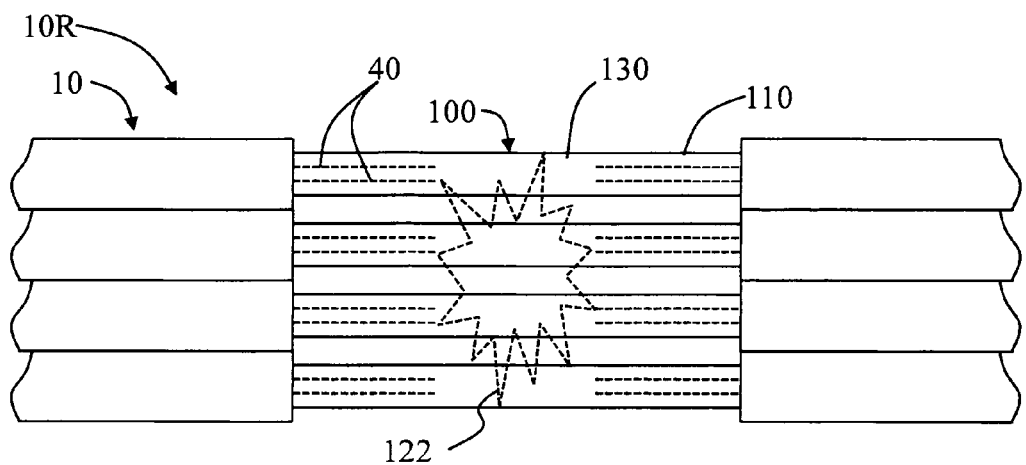
FIG. 7C and FIG. 7D are similar to FIG. 7A and FIG. 7B and illustrate an example embodiment of the invention as applied to a fiber ribbon.
Figure 7D:
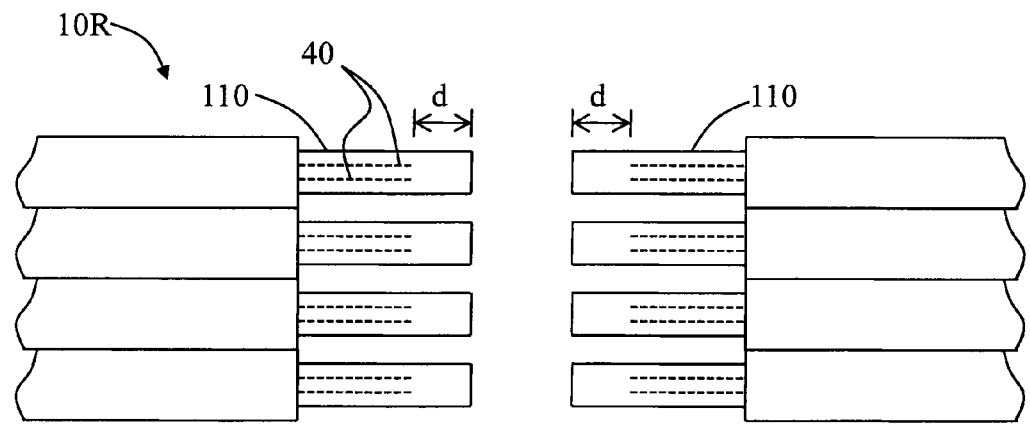

FIG. 7C and FIG. 7D are similar to FIG. 7A and FIG. 7B and illustrate an example embodiment of the present invention where the airlines 40 are substantially collapsed at localized mid-span region 100 in each of a plurality of bare fibers 110 in a fiber ribbon 10R. In an example embodiment, this is accomplished using a single electric arc 122 that provides a proportionally greater amount of heat than for a single fiber. The connectorization process to form connectorized optical fiber assembly 250 for the fiber ribbon is as described above, with connector ferrule 204 having a plurality of bores 203.

MFD Considerations for Single-Mode (SM) Fiber

An important consideration in connectorizing nano-engineered fibers is how the MFD is affected by forming substantially airline-free portion 130 using the methods described above. Maintaining the MFD of the nano-engineered fiber is important because mismatches in MFD between fibers cause attenuation when the two fibers are connected, e.g., via fusion splicing or via a fiber optic connector or splicing module.

Table 1 below presents measured data for the change in MFD for an example non-nano-engineered fiber in the form of Corning SMF-28e fiber subject to the electric arc method of the present invention. The data in Table 1 provide a baseline for the amount of change in MFD (i.e., the "ΔMFD") that can happen even to a standard (i.e., non-nano-engineered) fiber when subject to the methods of the present invention.

TABLE 1

MFD Change for Corning SMF-28e Fiber

| MFD (μm) | 1310 nm | 1550 nm | 1625 nm |
|---|---|---|---|
| Before Arc | 9.18 | 10.36 | 10.77 |
| After Arc | 9.27 | 10.50 | 10.92 |
| % Change (ΔMFD) | 1.00 | 1.42 | 1.42 |

Table 1 indicates that very small changes on the order of approximately 1% to 1.4% occur in MFD for SMF-28e fiber when an arc is applied to the fiber. This change can be attributed to small changes in the index of refraction profile of the fiber due to thermal diffusion of one or more dopants in the core region.

Table 2 below is similar to Table 1, and presents measured data for the change in MFD for a nano-engineered fiber 10 having a C/C ratio of 0.42. In this example embodiment $D_{10}$=125 microns, $\Delta_1$=approximately 0.34%, $R_1$=approximately 4.5 microns, $R_2$=approximately 10.7 microns, region 34 is comprised of approximately 200 holes having a mean diameter of approximately 230 nm and a maximum diameter of <700 nm, $W_{23}$=approximately 4 microns and $\Delta_2$=$\Delta_4$=approximately 0%, and the air-fill for this fiber=approximately 0.1%. This fiber had a cable cutoff of 1260 nm showing that this fiber was single-moded above 1260 nm.

Table 3 below is similar to Table 2, but for a nano-engineered fiber with a C/C ratio of 0.33. In this example embodiment $D_{10}$=125 microns, $\Delta_1$=approximately 0.34%, $R_1$=approximately 4.5 microns, $R_2$=approximately 13.6 microns, region 34 is comprised of approximately 200 holes having a mean diameter of approximately 230 nm and a maximum diameter of <700 nm, $W_{23}$=approximately 5 microns and $\Delta_2$=$\Delta_4$=approximately 0%, and the air-fill for this fiber=approximately 0.1%. This fiber had a cable cutoff of 1240 nm showing that this fiber was single-moded above 1240 nm.

TABLE 2

MFD Change for a Nano-engineered Fiber for C/C = 0.42

| MFD (μm) | 1310 nm | 1550 nm | 1625 nm |
|---|---|---|---|
| With airlines | 8.61 | 9.62 | 9.91 |
| Collapsed airlines | 9.21 | 10.97 | 11.61 |
| % Change (ΔMFD) | 6.52 | 12.31 | 14.64 |

TABLE 3

MFD Change for a Nano-engineered Fiber for C/C = 0.33

| MFD (μm) | 1310 nm | 1550 nm | 1625 nm |
|---|---|---|---|
| With airlines | 8.88 | 10.12 | 10.55 |
| Collapsed airlines | 9.26 | 10.86 | 11.48 |
| % Change (ΔMFD) | 4.10 | 6.81 | 8.10 |

The data in Table 2 and Table 3 indicate that the C/C ratio has a significant impact on the change in the MFD, wherein the higher C/C ratio leads to larger changes in the MFD than the smaller C/C ratio. The MFD also increases with increasing wavelengths. The data shows that the having a C/C of approximately ≦0.42 gives an acceptable change of approximately ≦10% in MFD at some if not all wavelengths.

Figure 8A:
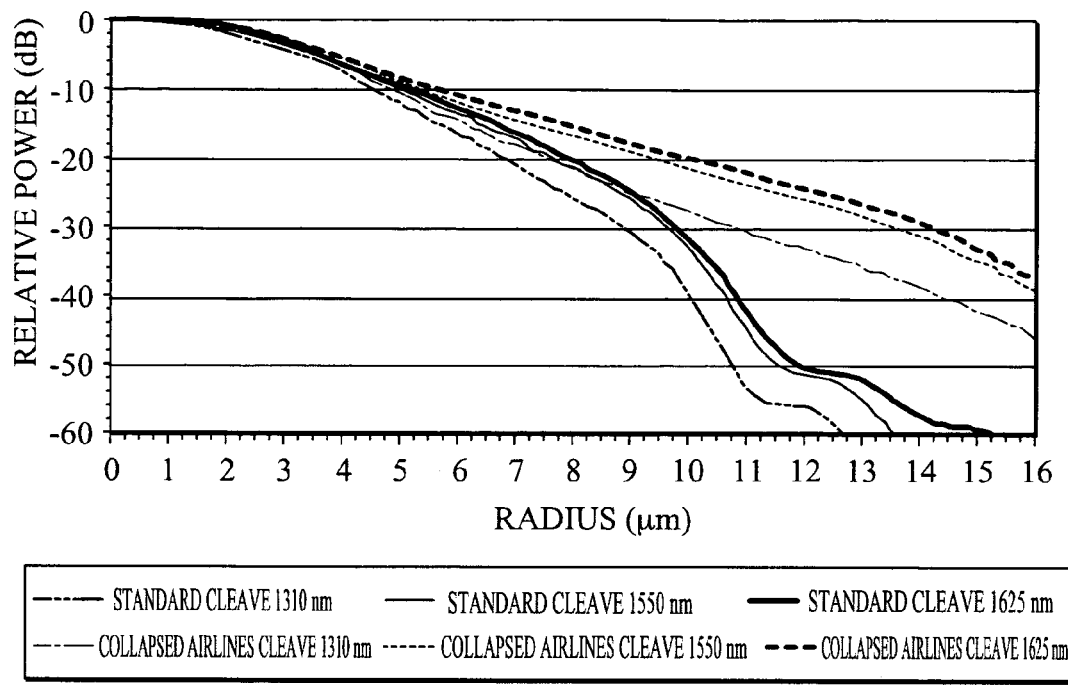
FIG. 8A is a plot of the relative power (dB) vs. fiber radius r (μm) for a nano-engineered fiber having a core/clad (C/C) ratio of 0.42, wherein the plot is representative of the MFD.
Figure 8B:
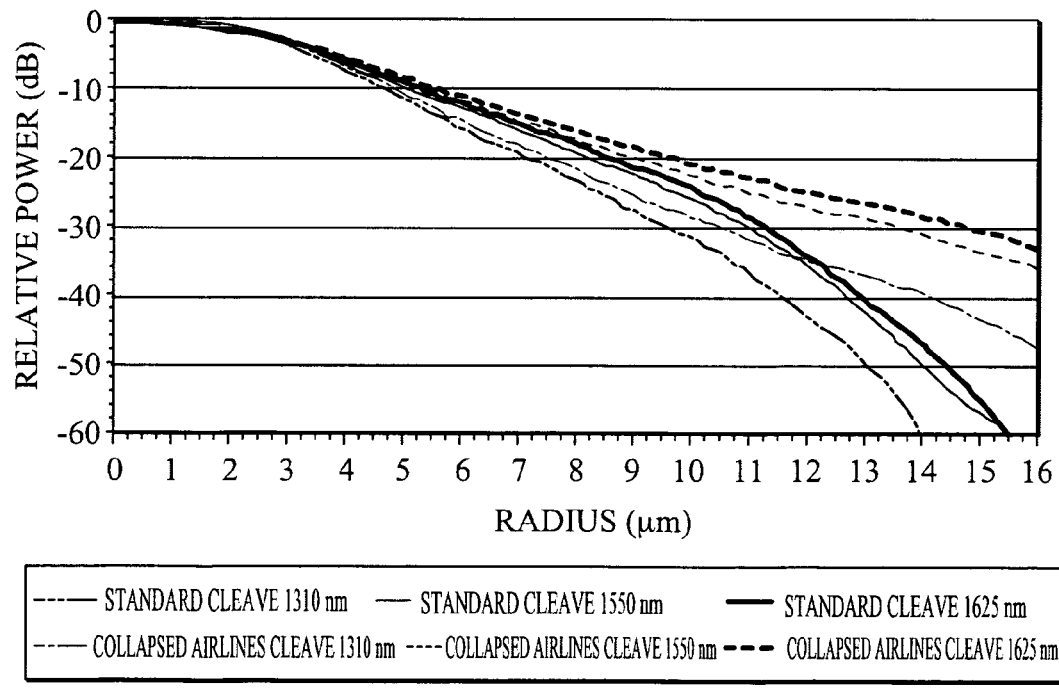
FIG. 8B is same plot as FIG. 8A but for a nano-engineered fiber having a C/C ratio of 0.33 and a smaller change in the MFD (i.e., a smaller ΔMFD) as compared to the plot of FIG. 8A.

FIG. 8A is a plot of the relative power (dB) vs. fiber radius r (μm) for a nano-engineered fiber 10 having a C/C ratio of 0.42, and FIG. 8B is a plot of the relative power (dB) vs. fiber radius r (μm) for a nano-engineered fiber having a C/C ratio of 0.33. The power measurements were taken at the substantially airline-free portion 130 as well as airline-containing portions of the fiber. The differences in the power curves represent the ΔMFD. The results shown in FIG. 8A and FIG. 8B confirm that a lower C/C ratio is needed in order to preserve the MFD between the airline-containing and substantially airline-free portions of the fiber.

In an example embodiment, the ΔMFD is less than or equal to about 20%, more preferably less than or equal to about 15%, more preferably less than or equal to about 10%, and even more preferably less than or equal to 5%.

Figure 9:
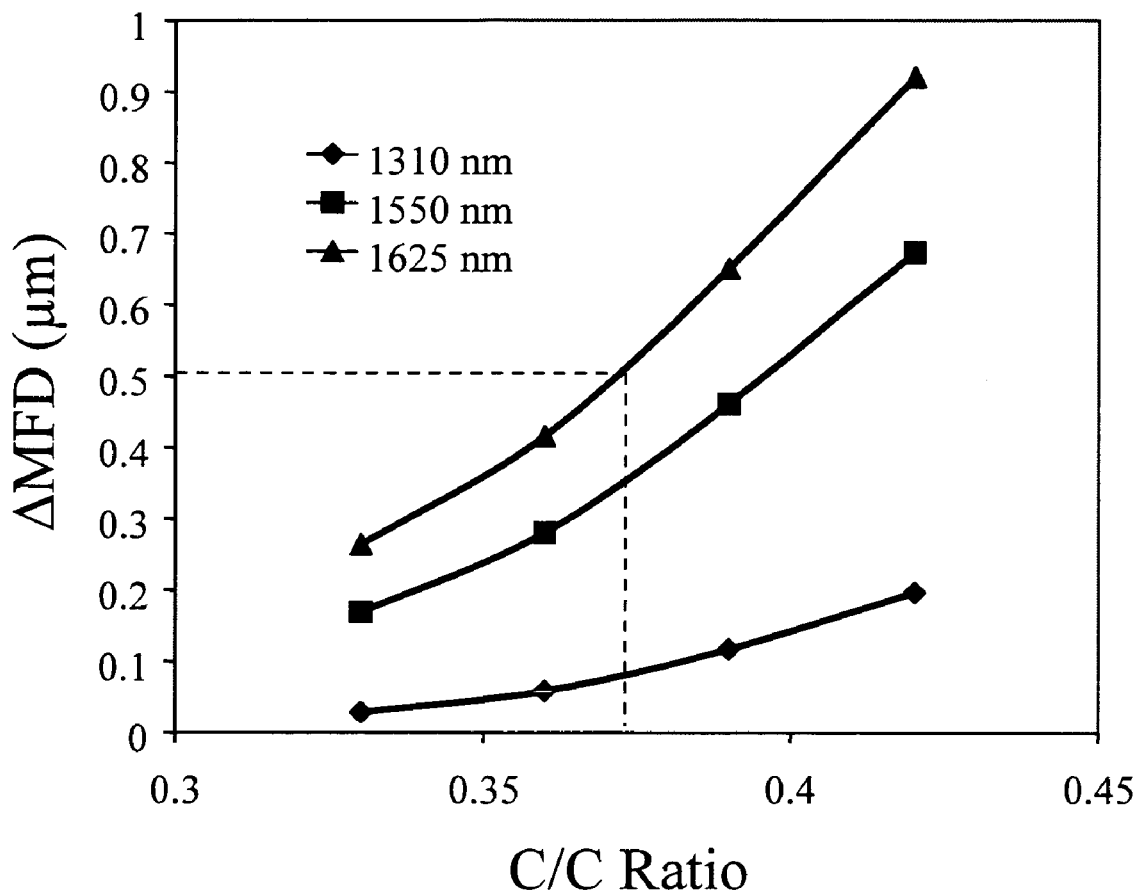
FIG. 9 plots simulated data that represents the theoretical ΔMFD (in μm) between the processed and unprocessed regions of the nano-engineered fiber as a function of the C/C ratio.

FIG. 9 plots simulated (modeled) data of the ΔMFD (in μm) versus the C/C ratio for a 125 μm nano-engineered fiber 10 that is single-mode above λ=1260 nm, and wherein ΔMFD is the difference between the MFD in the unprocessed nano-engineered portion of the fiber as compared to the MFD in the processed substantially airline-free portion 130 formed using the above methods. The plot of FIG. 9 includes modeled data for the wavelengths 1310 nm (curve with diamonds), 1550 nm (curve with squares) and 1625 nm (curve with triangles) and represents the theoretical limits of ΔMFD as a function of the C/C ratio and as a function of wavelength for nano-engineered fibers 10. The plot shows that the ΔMFD increases with an increasing the C/C ratio and increases with an increasing wavelength.

The inventors have confirmed through the modeling of FIG. 9 that a ΔMFD of less than 0.5 μm (i.e., <6% of an approximately a 8.4 μm MFD at λ=1310 nm) requires a C/C ratio of less than 0.37 for wavelengths up to 1625 nm (see dashed line in plot). The plot of FIG. 9 also indicates that ΔMFDs as small as 0.27 μm (i.e., a ΔMFD of about 2.7% for a MFD about 10 μm at λ=1625 μm), as small as 0.17 μm (i.e., a ΔMFD of about 1.7% for a MFD about 10 μm at λ=1550 μm), and as small as about 0.03 μm (i.e., a ΔMFD of about 0.4% for a MFD about 8.4 μm at λ=1310 μm) are achievable using the present invention.

Fiber Diameter Considerations

As discussed above, nano-engineered fibers 10 to which the methods of the present invention apply preferably have a relatively low air-fill percent of less than 1% and is preferably about 0.02% to about 0.2%. This is in contrast to photonic crystal fibers, which have an air-fill percent of 5% to 20%, i.e., at least five times greater, and usually about two orders of magnitude greater. Thus, it is the relatively small air-fill percent of the nano-engineered fibers 10 considered herein that allows the fibers to retain their circularity and nominally their original size when the airlines are substantially collapsed. This allows the processed fibers to remain compliant with the ITU-T G.652 standard wherein the (bare) fiber has a diameter $D_{10}$=125 μm+/−1 micron for proper connectorization.

In contrast, a photonic crystal fiber, after substantially collapsing the air holes therein, has a diameter change far greater than +/−1 micron, and thus is not ITU-T G.652 compliant for connectorization. Assuming that the relative air-fill percents correspond to the amount of fiber diameter change, then a photonic crystal fiber undergoes a diameter change of at least about 5× that of a nano-engineered fiber, and more typically about 100×. Thus, an overall change in $D_{10}$ for a 125 μm fiber of less than 0.6 μm, which would be acceptable for connectorizing a nano-engineered fiber 10, would translate into a change of at least 2.5 μm and more typically a change of about 5 to 50 μm when the method is applied to a photonic crystal fiber—a change that would be deemed unacceptable for the connectorization contemplated by the present invention.

The methods of the present invention are able to substantially collapse airlines 40 in nano-engineered fiber 10 while retaining substantially the same cross-sectional diameter $D_{10}$ and circularity, making the fibers and methods advantageous for mounting the processed nano-engineered fiber within a ferrule in the course of forming a connectorized fiber.

In an example embodiment, the change $\Delta D_{10}$ in the diameter $D_{10}$ of fiber 10 at substantially airline-free region 130 as compared to the other non-processed (i.e., airline-inclusive or airline containing) regions of the fiber is less than or equal to 1% (0.125 μm), more preferable less than or equal to 0.50% (0.625 μm), even more preferably less than or equal to 0.24% (0.30 μm), and even more preferably less than or equal to 0.08% (0.10 μm). The numbers in parenthesis are the actual percentage values for a 125 μm diameter nano-engineered fiber 10.

Substantially Collapsed Airlines

In example embodiment of the present invention, fiber end face 112 can have one or more airlines 40, provided that the number of airlines (i.e., the air-fill percent) is sufficiently small so that the potential for contamination of the fiber end face due to the presence of the one or more airlines is insubstantial. While having no airlines 40 at fiber end face 112 is generally preferred, allowing for the fiber end face to have one or more airlines but still be "substantially airline free" as defined above allows for a larger process window when thermally processing and cleaving fiber 10.

Figure 10:
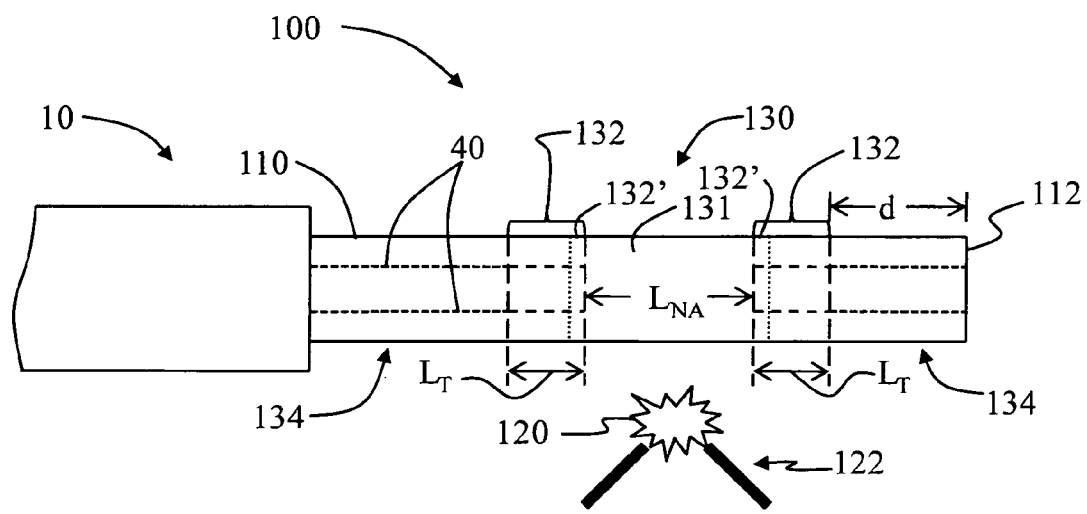
FIG. 10 is similar to FIG. 5C, and illustrates an example embodiment wherein the localized heating of the nano-engineered fiber forms an airline-free portion of length $L_{NA}$ and two adjacent airline transition zones ("transition zones") of length $L_T$.

FIG. 10 is similar to FIG. 5C, and illustrates an example embodiment wherein the localized heating of nano-engineered fiber 10 forms an airline-free portion 131 of length $L_{NA}$ and two adjacent airline transition zones ("transition zones") 132 of length $L_T$. In an example embodiment, 100 μm≦$L_T$≦200 μm. Transition zones 132 connect airline-free portion 131 to respective airline-containing portions 134 in which the number of airlines remains unchanged after thermal processing mid-span localized region 100. Airline-containing portion 134 thus includes airlines 40 in the air-fill percent of the original nano-engineered fiber 110. Imaginary vertical dashed lines are shown to denote the boundary between the transition zones 132 and airline-free portion 131 and airline-containing portions 134.

In each transition zone 132, the number of airlines 40 changes from substantially no airlines at or near the boundary with airline-free portion 131 to substantially the same number of airlines as airline-containing portion 134 at or near the boundary with the airline-containing portion. Substantially airline-free portion 130 includes airline-free portion 131 and respective portions 132' of transition zones 132 as denoted by imaginary vertical dotted lines within the transition zones. Note that transition zone portions 132' are immediately adjacent air-line free portion 131.

In an example embodiment, transition zone portions 132' included in substantially airline-free portion 130 have a small number of airlines 40, such as no more than 20% of the initial air-fill percent of airline-containing portion 134. Stated differently, transition zone portions 132' that constitute substantially airline-free portion 130 have an air-fill percent that has been reduced by at least a factor of 5 from the initial air-fill percent of airline-containing portion 134.

Figure 11:
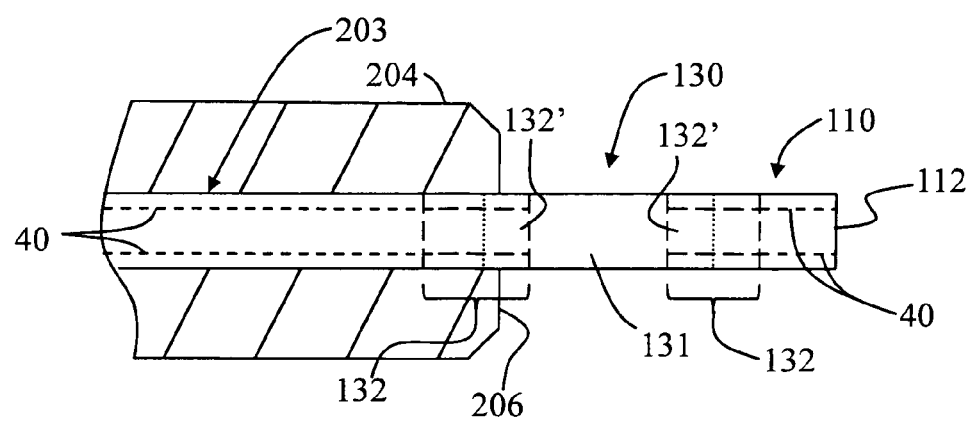
FIG. 11 is similar to FIG. 5E, and illustrates an example embodiment wherein the nano-engineered fiber is arranged in a ferrule so that one of the transition zone portions is arranged at the ferrule end face.

FIG. 11 is similar to FIG. 5E, and illustrates an example embodiment wherein the nano-engineered fiber 10 is arranged in ferrule 204 so that one of the transition zone portions 132' is arranged at ferrule end face 206. Fiber 10 can then be cleaved so that fiber end face 112 is substantially airline free.

Figure 12:
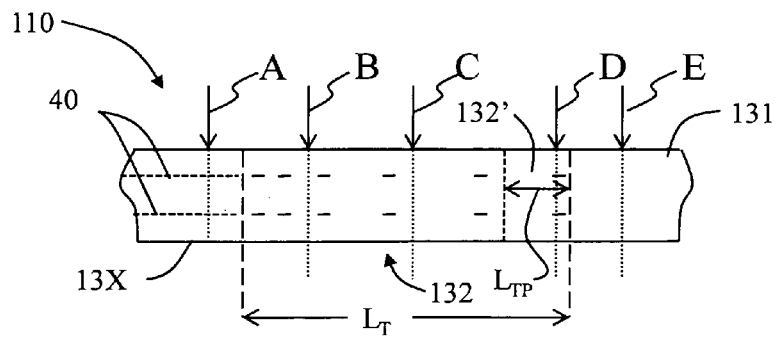
FIG. 12 is a close-up view of a section of processed nano-engineered fiber, illustrating the airline-free portion and the transition zone between the airline-free portion and the airline-containing portion and showing a number of cross-section locations A through E.

FIG. 12 is a close-up view of a section of thermally processed nano-engineered fiber 10, illustrating airline-free portion 130 and one transition zone 132 between the airline-free portion and the airline-containing portion 134. FIG. 12 shows a number of locations A through E along the length of nano-engineered fiber 10. FIG. 12 also shows a transition zone portion 132' of length $L_{TP}$. Note that location D is within transition zone portion 132'.

FIGS. 13A-13E are various schematic cross-sectional views of the nano-engineered fiber of FIG. 12 taken at respective locations A through E in FIG. 12 and seen under 400× optical microscope magnification. FIGS. 13A-13E schematically illustrate the change in the amount (i.e., the number or air-fill percent) of airlines 40 from the airline-containing portion 134 to the airline-free portion 131 and as well as the change within transition zone 132.

Figures 13A, 13B, 13C:
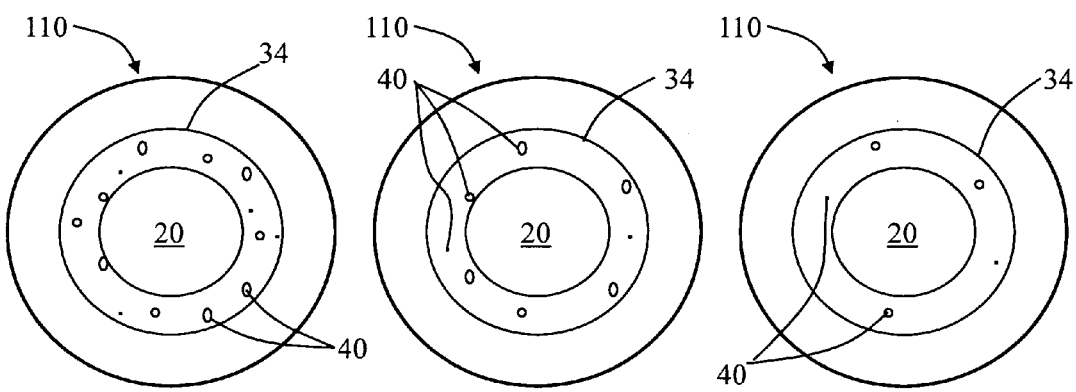
FIGS. 13A-13E are various schematic cross-sections of the nano-engineered fiber of FIG. 12 as viewed under 400× optical microscope magnification, schematically illustrating the change in the amount of airlines (and thus the change in air-fill percent) from the airline-containing portion to the airline-free portion as well as within the transition zone for the various cross-sections A through E.

In particular, FIG. 13A is a schematic cross section taken at location A in airline-containing region 134 in FIG. 12 and schematically illustrates an example initial distribution of airlines 40.

FIG. 13B is a schematic cross section taken at location B in FIG. 12 and schematically illustrates an example distribution of airlines 40 in transition zone 132. Location B is about (⅕)$L_T$ away from the boundary with airline-containing portion 134. The cross-section shows a slight reduction in the number of airlines 40 as compared to the cross section of FIG. 13A taken in airline-containing region 134.

FIG. 13C is a schematic cross section taken at location C in FIG. 12 and schematically illustrates an example distribution of airlines 40 in another location within transition zone 132. Location C is about mid-way between airline-containing portion 134 and airline-free portion 131. The cross-section shows a substantial reduction in the number of airlines 40 as compared to the cross section of FIG. 13A.

Figures 13D, 13E:
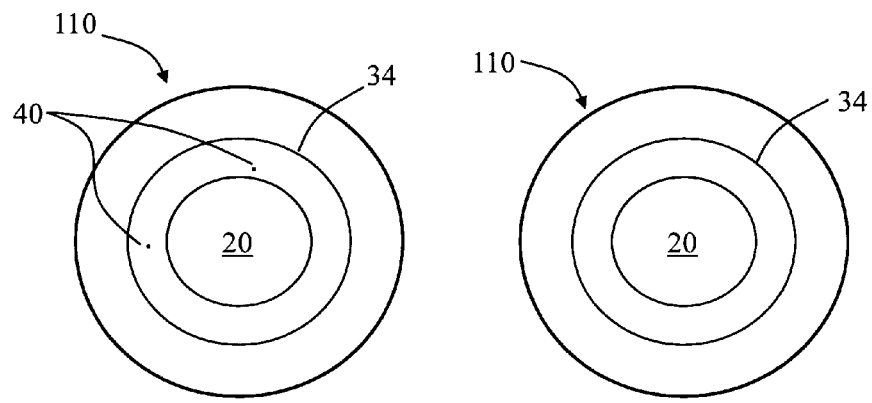

FIG. 13D is a schematic cross section taken at location D in FIG. 12 and schematically illustrates an example distribution of airlines 40 in another location within transition zone 132. Location D is about (1/25)$L_T$ away from the boundary with airline-free portion 130 and well within transition zone portion 132'. The cross-section shows only two very small remnants of airlines 40 that are just barely visible at 400× magnification. In an example embodiment, the boundary between transition zone 132 and airline-free portion 131 is defined as the plane at which airlines 40 are no longer visible under 400× magnification. This plane would lie very close to location D.

FIG. 13E is a schematic cross section taken at location E in FIG. 12 and schematically illustrates an example distribution of airlines 40 in airline-free portion 132. Because location E is airline-free portion 131, by definition there are no airlines 40 visible under 400× magnification.

Figure 14:
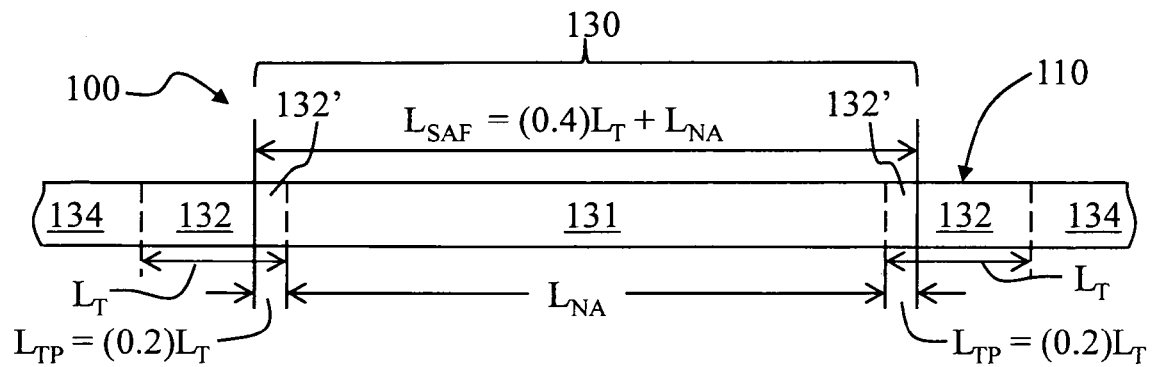
FIG. 14 is a close-up view of a section of the nano-engineered fiber similar to that of FIG. 12, illustrating the airline-free portion of length $L_{NA}$, two airline transition zones of length $L_T$ and the corresponding transition zone portions of length $L_{TP}$, and the two airline-containing portions, illustrating an example of how the substantially airline-free portion of the fiber can include the transition zone portions.

FIG. 14 is a close-up view of a section of nano-engineered fiber 10 similar to FIG. 12, illustrating the airline-free portion 131 of length $L_{NA}$, two transition zones 132, corresponding transition zone portions 132' and two airline-containing portions 134. In an example embodiment that assumes a linear transition in the reduction the air-fill percent of airlines 40 over length $L_T$ of each transition zone 132, the "substantially airline-free" portion of fiber 10 includes airline-free portion 132 as well as transition zone portions 132' of length $L_{TP}=(0.2)L_T$ on either side of the airline-free portion. Thus, in an example embodiment, the substantially airline-free portion 130 of fiber 10 has a length $L_{SAF}$ of the substantially airline-free portion of fiber 10 is given by: $L_{SAF}=L_{NA}+2L_{TP}=2(0.2)L_T+L_{NA}=(0.4)L_T+L_{NA}$.

Figure 15:
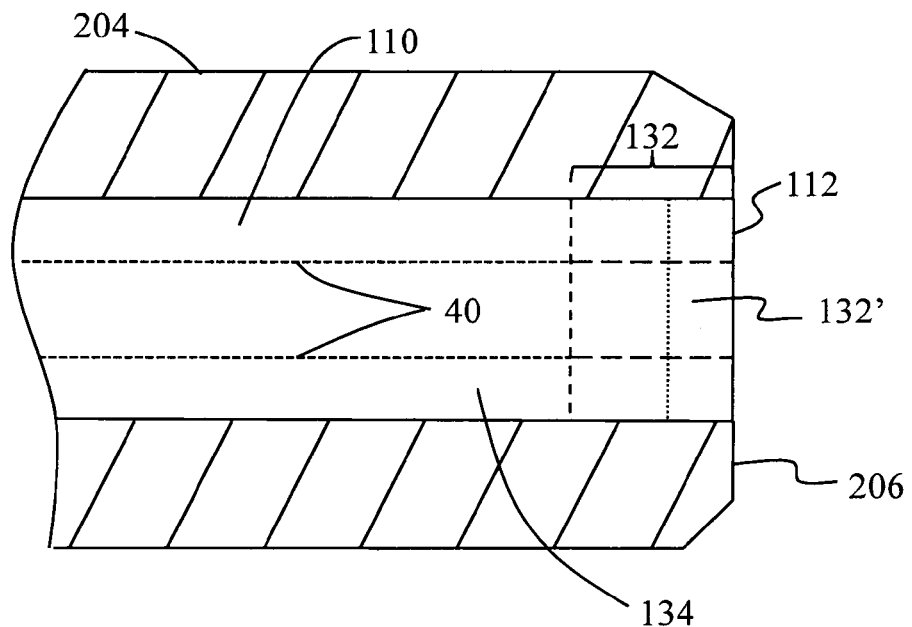
FIG. 15 is similar to FIG. 6, and illustrates an example embodiment wherein the fiber end face at the ferrule end is formed within the transition zone portion.

FIG. 15 is similar to FIG. 6, and illustrates an example embodiment wherein the fiber end face 112 at the ferrule end 206 is formed within transition zone portion 132' so that the fiber end face has one or more airlines 40 but also at least a 5× reduction in air-fill percent as compared with airline-containing portion 134.

Figure 16A:
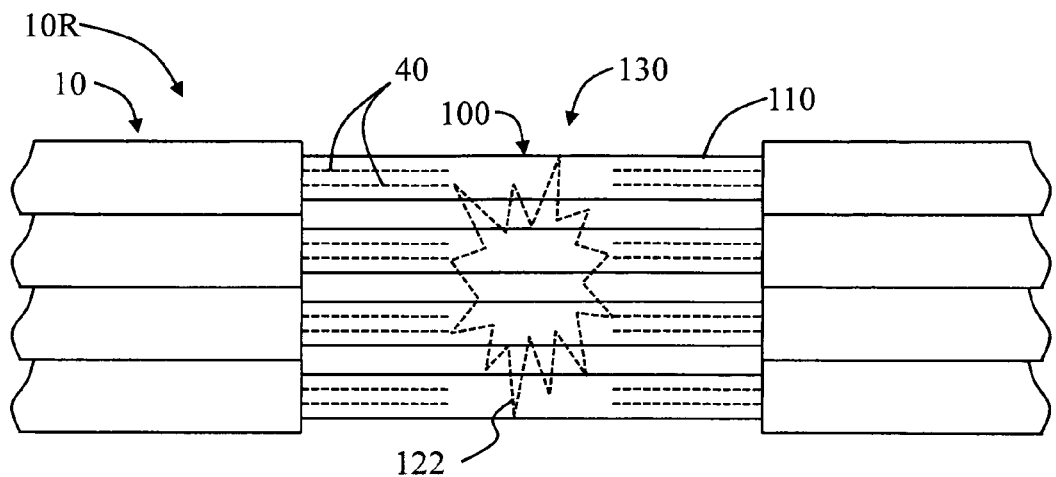
FIGS. 16A and 16B are similar to FIGS. 7C and 7D, and shows the airline transition zones and transition zone portions within which nano-engineered fibers in the fiber ribbon can be cleaved.
Figure 16B:
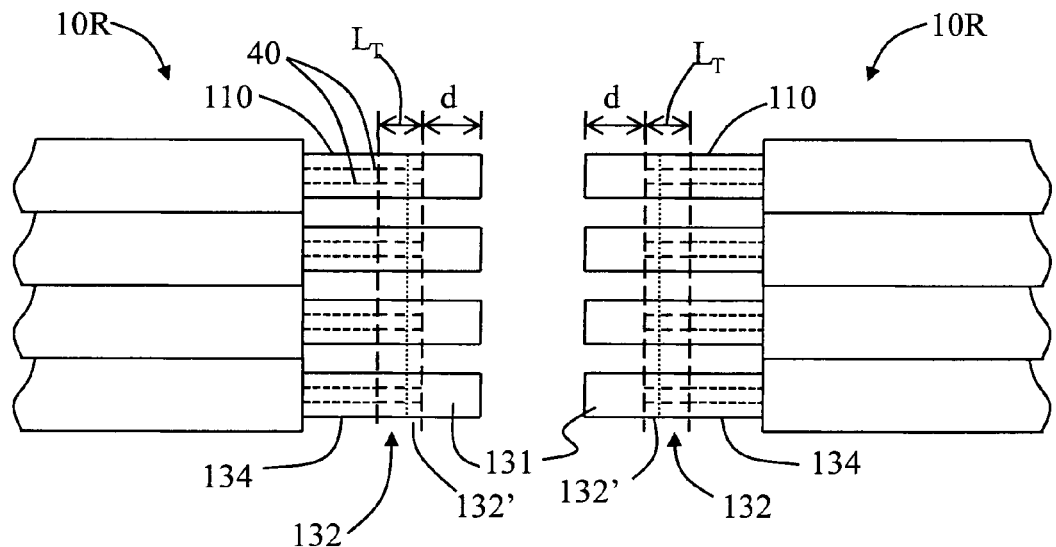

FIGS. 16A and 16B are similar to FIGS. 7C and 7D, and shows the airline transition zones 132 and corresponding transition zone portions 132' within which bare nano-engineered fibers 110 can be cleaved in order to form fiber end faces 112 that include one or more airlines 40 with at least a 5× reduction in air-fill percent as compared to airline-containing portion 134.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of connectorizing an optical fiber comprising:
    providing a nano-engineered optical fiber having a core, a cladding with non-periodically disposed airlines having a corresponding initial air-fill percent within an airline-containing portion, and at least one of a coating and a buffer;
    stripping a length of the at least one of the coating and the buffer to expose a mid-span portion of the optical fiber;
    selectively applying an amount of energy to the mid-span portion sufficient to substantially collapse the airlines at the mid-span portion to form a substantially airline-free portion thereat and within which the initial air-fill percent is reduced by at least a factor of 5;
    mounting the optical fiber within a connector ferrule having a ferrule end face so that the substantially airline-free portion is arranged at the ferrule end face and so that a portion of the fiber protrudes beyond the ferrule end face; and
    cleaving the optical fiber through the substantially airline-free portion at or near the ferrule end face.

2. The method of claim 1, wherein the initial air-fill percent is reduced by at least a factor of 50.

3. The method of claim 1 wherein the initial air-fill percent is reduced by at least a factor of 500.

4. The method according to claim 1, including polishing the fiber end face to lie in a common plane with the ferrule end face.

5. The method according to claim 1, wherein the optical fiber has an initial air-fill percent selected from the following group of air-fill percentages: less than about 1% and greater than about 0.02%; less than about 0.7% and greater than about 0.02%; and less than about 0.2% and greater than about 0.02%.

6. The method according to claim 1, wherein the optical fiber has an average airline size less than about 0.3 microns and greater than 0.005 microns in cross-sectional diameter.

7. The method according to claim 1, wherein the stripped optical fiber has a cross-sectional diameter that does not change by more than about 1% after the airlines are substantially collapsed.

8. The method according to claim 1, including providing the amount of energy in the form of an electric arc having an associated current between about 12 mA and about 16 mA.

9. The method of claim 1, including:
    providing a plurality of said nano-engineered fibers in the form of a ribbon; and
    selectively applying said amount of energy to at least one of the fibers at said mid-span portion to form said substantially airline-free portion thereat.

10. The method according to claim 1, wherein the energy is supplied from at least one of a fusion splicer, a flame, a filament, and a laser.

11. The method of claim 1, wherein the stripped fiber has a fiber diameter, and further including forming the substantially airline-free portion at least ten fiber diameters from the fiber end face that exists prior to said cleaving operation.

12. The method of claim 11, including forming the substantially airline-free portion in the range from ten fiber diameters to eighty fiber diameters from said fiber end face.

13. The method of claim 1, including performing the acts therein in the order presented.

14. The method of claim 1, wherein the substantially airline-free portion includes an airline-free portion and a portion of an airline transition zone between the airline-free portion and the airline-containing portion.

15. The method of claim 14, wherein the portion of the airline transition zone has an air-fill percent that has been reduced from the initial air-fill percent by at least a factor of 5.

16. The method of claim 15, wherein said cleaving includes cleaving the optical fiber through the airline transition zone portion.

17. The method of claim 14, wherein the airline transition zone has a length $L_T$ such that $100 \,\mu m \leq L_T \leq 200 \,\mu m$.

18. A method of connectorizing an optical fiber, comprising:
    providing a nano-engineered optical fiber having a core, a cladding with non-periodically disposed airlines having an initial air-fill percent, and at least one of a coating and a buffer, wherein the optical fiber has a core/cladding ratio of 0.42 or less and has associated therewith a first mode field diameter (MFD) at a given wavelength;
    stripping a length of the at least one of the coating and the buffer to expose a mid-span portion of the optical fiber;
    applying an amount of energy to the mid-span portion sufficient to substantially collapse the airlines at the mid-span portion to form a substantially airline-free portion thereat and within which the initial air-fill percent is reduced at least a factor of 5, and wherein said substantially airline-free portion has associated therewith a second MFD at said given wavelength, and wherein the change between said first MFD and said second MFD is 20% or less;
    mounting the optical fiber within a connector ferrule so that a portion of the fiber protrudes beyond the ferrule end face, with the substantially airline-free portion positioned at the ferrule end face; and
    cleaving the optical fiber through the mid-span substantially airline-free portion at or near the ferrule end face to provide a fiber end face having substantially no airlines.

19. The method of claim 18, wherein the initial air-fill percent is reduced by at least a factor of 50.

20. The method of claim 18, wherein the initial air-fill percent is reduced by at least a factor of 500.

21. The method according to claim 18, including polishing the fiber end face to lie in a common plane with the ferrule end face.

22. The method according to claim 18, further including polishing the fiber end face and ferrule end face.

23. The method according to claim 18, wherein the optical fiber has an initial air-fill percent selected from the following group of air-fill percentages: less than about 1% and greater than about 0.02%; less than about 0.7% and greater than about 0.02%; and less than about 0.2% and greater than about 0.02%.

24. The method of claim 18, wherein the stripped fiber has a fiber diameter, and further including forming the substantially airline-free portion at least ten fiber diameters from the fiber end face that exists prior to said cleaving operation.

25. The method according to claim 18, wherein the energy is supplied from at least one of a fusion splicer, a flame, a filament, and a laser.

26. The method of claim 18, including performing the acts therein in the order presented.

27. The method of claim 18, wherein the substantially airline-free portion includes an airline-free portion and a portion of an airline transition zone between the airline-free portion and the airline-containing portion.

28. The method of claim 27, wherein the portion of the airline transition zone has an air-fill percent that has been reduced from the initial air-fill percent by at least a factor of 5.

29. The method of claim 28, wherein said cleaving includes cleaving the optical fiber through the airline transition zone portion.

30. The method of claim 27, wherein the airline transition zone has a length $L_T$ such that $100\ \mu m \leq L_T \leq 200\ \mu m$.

31. A method of connectorizing an optical fiber, comprising:
providing a nano-engineered fiber having a core, a cladding with non-periodically disposed airlines having corresponding initial air-fill percentage within an airline-containing portion, an outer diameter, and at least one of a coating and a buffer;
stripping a length of the at least one of the coating and the buffer to expose a mid-span portion of the optical fiber; and
applying an amount of energy to the mid-span portion sufficient to substantially collapse the airlines at the mid-span portion to form a substantially airline-free portion thereat and within which the initial air-fill percent is reduced at least a factor of 5, and wherein the cladding outer diameter changes by no more than 1% in the substantially airline-free portion.

32. The method of claim 31, wherein the initial air-fill percent is reduced by at least a factor of 50.

33. The method of claim 31, wherein the initial air-fill percent is reduced by at least a factor of 500.

34. The method of claim 31, further including mounting the optical fiber within a connector ferrule so that a portion of the fiber protrudes beyond the ferrule end face with the substantially airline-free portion positioned at the ferrule end face.

35. The method of claim 34, further including cleaving the optical fiber through the mid-span substantially airline-free portion at or near the ferrule end face to provide a fiber end face.

36. The method of claim 35, further including polishing the fiber end face.

37. The method of claim 31, wherein the cladding outer diameter is 125 μm, and wherein the cladding outer diameter changes by no more than +/−1 μm in the substantially airline-free portion.

38. The method of claim 31, further including forming the substantially airline-free portion at least ten fiber diameters from the fiber end face that exists prior to said cleaving operation.

39. The method according to claim 31, wherein the energy is supplied from at least one of a fusion splicer, a flame, a filament, and a laser.

40. The method according to claim 31, wherein the optical fiber has an average initial airline size less than about 0.3 microns and greater than 0.005 microns in cross-sectional diameter.

41. The method of claim 31, including performing the acts therein in the order presented.

42. The method of claim 31, wherein the substantially airline-free portion includes an airline-free portion and a portion of an airline transition zone between the airline-free portion and the airline-containing portion.

43. The method of claim 42, wherein the portion of the airline transition zone has an air-fill percent that has been reduced from the initial air-fill percent by at least a factor of 5.

44. The method of claim 43, wherein said cleaving includes cleaving the optical fiber through the airline transition zone portion.

45. The method of claim 42, wherein the airline transition zone has a length $L_T$ such that $100\ \mu m \leq L_T \leq 200\ \mu m$.

* * * * *